US008515740B2

(12) United States Patent  
Fux et al.

(10) Patent No.: US 8,515,740 B2  
(45) Date of Patent: *Aug. 20, 2013

(54) HANDHELD ELECTRONIC DEVICE AND METHOD FOR DISAMBIGUATION OF COMPOUND TEXT INPUT AND THAT EMPLOYS N-GRAM DATA TO LIMIT GENERATION OF LOW-PROBABILITY COMPOUND LANGUAGE SOLUTIONS

(75) Inventors: Vadim Fux, Waterloo (CA); Michael G. Elizarov, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,310

(22) Filed: Aug. 13, 2012

(65) Prior Publication Data

US 2012/0310631 A1    Dec. 6, 2012

Related U.S. Application Data

(63) Continuation of application No. 13/308,616, filed on Dec. 1, 2011, now Pat. No. 8,265,926, which is a continuation of application No. 12/710,618, filed on Feb. 23, 2010, now Pat. No. 8,090,572, which is a continuation of application No. 11/331,700, filed on Jan. 13, 2006, now Pat. No. 7,698,128.

(51) Int. Cl.
*G06F 17/27* (2006.01)

(52) U.S. Cl.
USPC .......... 704/9; 704/1; 704/10; 341/22; 341/26; 345/168; 345/156; 707/706; 707/707; 707/708; 715/261; 715/816

(58) Field of Classification Search
USPC .................. 704/1–10; 341/22, 26; 345/168, 345/156; 707/706–708; 715/261, 816
See application file for complete search history.

(56) References Cited

U.S. PATENT DOCUMENTS

| | | | |
|---|---|---|---|
| 4,672,571 A | 6/1987 | Bass et al. |
| 4,679,951 A | 7/1987 | King et al. |
| 4,777,617 A | 10/1988 | Frisch et al. |
| 4,969,097 A | 11/1990 | Levin |
| 6,185,524 B1 | 2/2001 | Carus et al. |
| 6,393,399 B1 | 5/2002 | Even |
| 6,473,754 B1 | 10/2002 | Matsubayashi et al. |
| 6,542,170 B1 | 4/2003 | Williams et al. |
| 6,738,741 B2 | 5/2004 | Emam et al. |

(Continued)

FOREIGN PATENT DOCUMENTS

| | | |
|---|---|---|
| EP | 1031914 A | 8/2000 |
| EP | 1603017 A | 12/2005 |
| WO | 03044649 | 5/2003 |

OTHER PUBLICATIONS

Office Action from Canadian Intellectual Property Office dated Mar. 2, 2011 in Canadian Application No. 2,635,009, pp. 1-2.

*Primary Examiner* — Lamont Spooner

(74) *Attorney, Agent, or Firm* — Finnegan, Henderson, Farabow, Garrett & Dunner, LLP

(57) ABSTRACT

A handheld electronic device includes a reduced QWERTY keyboard and is enabled with disambiguation software that is operable to disambiguate compound text input. The device is able to assemble language objects in the memory to generate compound language solutions. The device is able to analyze the combinations of language objects in light of N-gram data stored on the device to avoid proposing low-probability compound language solutions.

8 Claims, 14 Drawing Sheets

(56) References Cited

U.S. PATENT DOCUMENTS

| | | |
|---|---|---|
| 6,754,617 B1 | 6/2004 | Ejerhed |
| 6,973,332 B2 | 12/2005 | Mirkin et al. |
| 7,155,683 B1 | 12/2006 | Williams |
| 7,177,797 B1 | 2/2007 | Micher et al. |
| 7,219,052 B2 | 5/2007 | Sites |
| 7,680,649 B2 | 3/2010 | Park |
| 7,881,936 B2 | 2/2011 | Longe et al. |
| 2003/0097252 A1 | 5/2003 | Mackie |
| 2005/0096085 A1 | 5/2005 | Mirkin et al. |
| 2005/0162395 A1 | 7/2005 | Unruh |
| 2006/0025988 A1 | 2/2006 | Xu et al. |

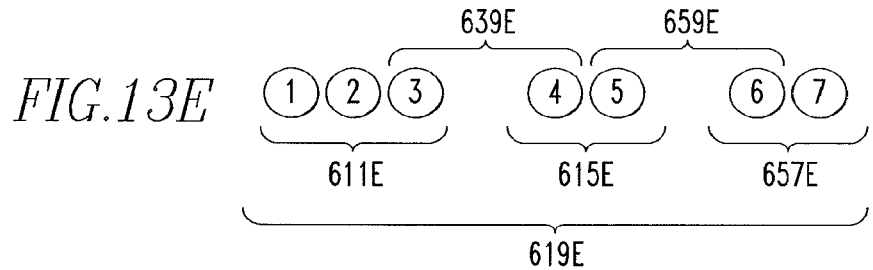
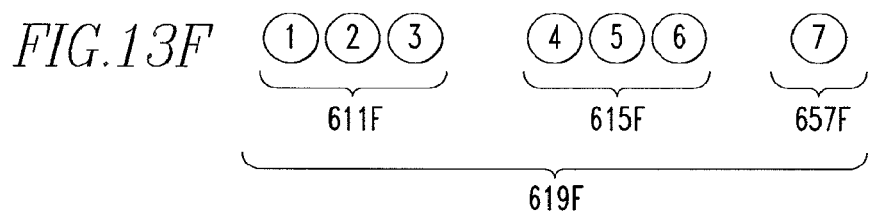
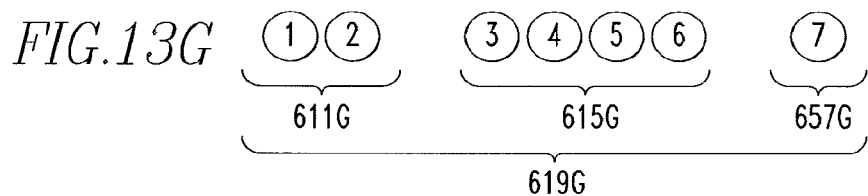
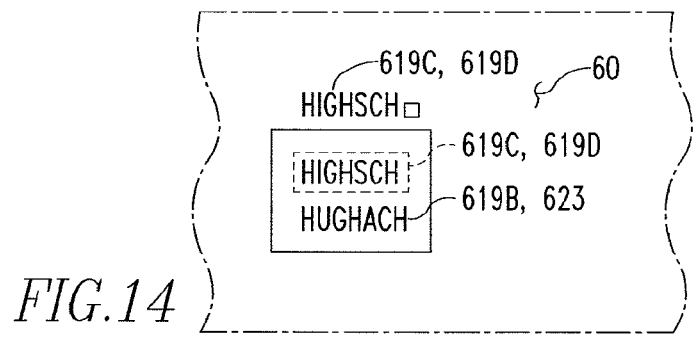
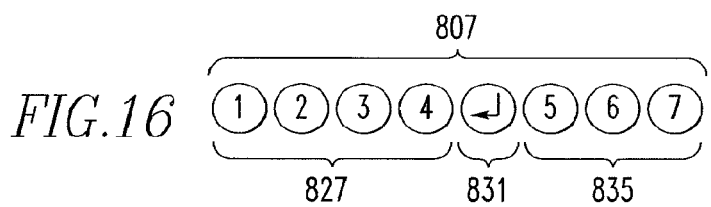

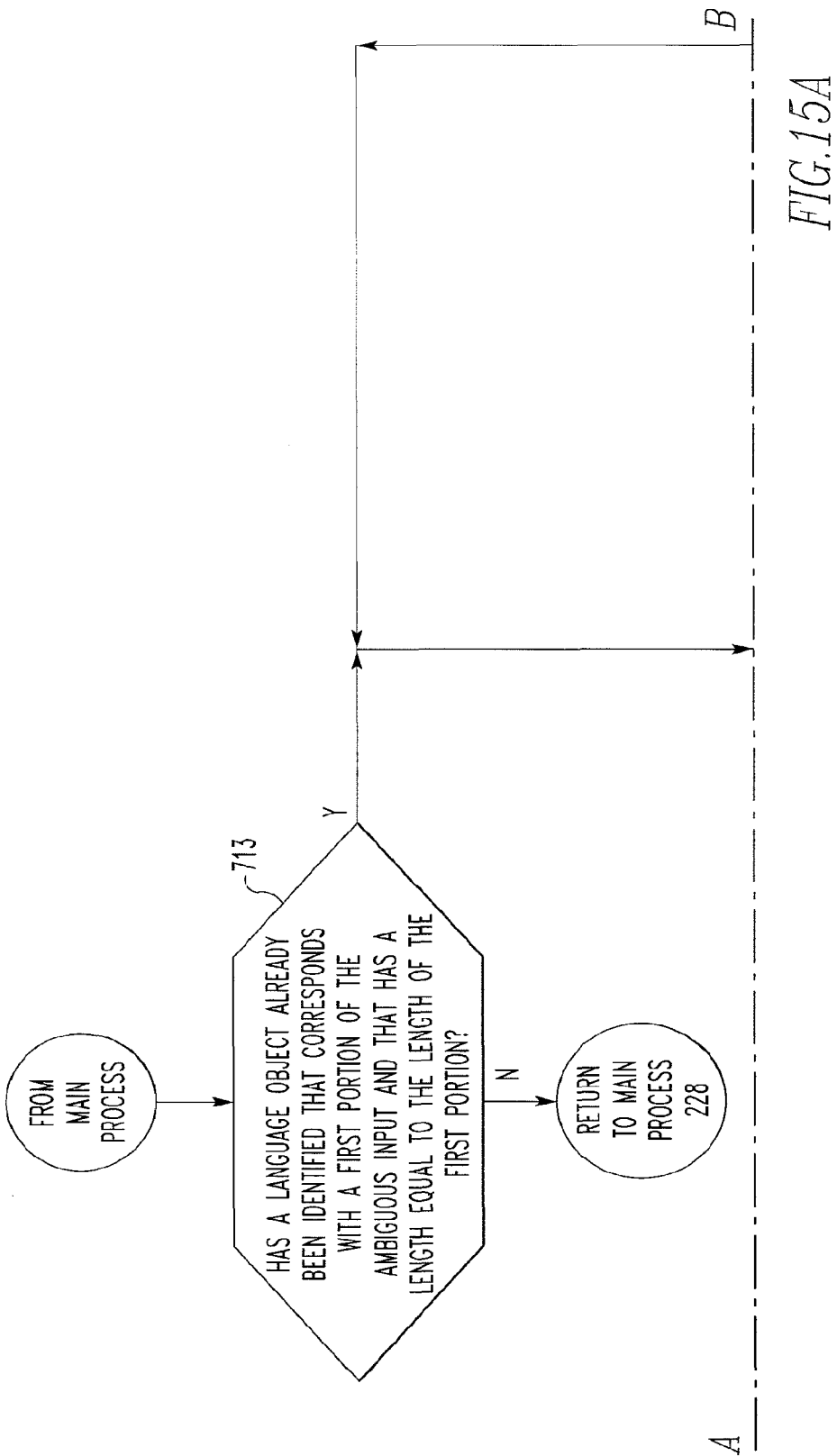

HANDHELD ELECTRONIC DEVICE AND METHOD FOR DISAMBIGUATION OF COMPOUND TEXT INPUT AND THAT EMPLOYS N-GRAM DATA TO LIMIT GENERATION OF LOW-PROBABILITY COMPOUND LANGUAGE SOLUTIONS

This is a continuation of co-pending application Ser. No. 13/308,616, filed Dec. 1, 2011, which is a continuation of application Ser. No. 12/710,618, issued as U.S. Pat. No. 8,090,572, filed Feb. 23, 2010, which is a continuation of application Ser. No. 11/331,700, issued as U.S. Pat. No. 7,698,128, filed Jan. 13, 2006, all of which are incorporated herein by reference.

BACKGROUND

1. Field

The disclosed and claimed concept relates generally to handheld electronic devices and, more particularly, to a handheld electronic device having a reduced keyboard and a compound text input disambiguation function, and also relates to an associated method.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While they systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed, and while many have been generally effective for their intended purposes, shortcomings still exist.

It would be desirable to provide an improved handheld electronic device with a reduced keyboard that seeks to mimic a QWERTY keyboard experience or other particular keyboard experience. Such an improved handheld electronic device might also desirably be configured with enough features to enable text entry and other tasks with relative ease.

BRIEF DESCRIPTION OF THE DRAWINGS

A full understanding can be gained from the following Description when read in conjunction with the accompanying drawings in which:

FIG. 13E is a schematic depiction of the ambiguous input of FIG. 13 in accordance with another compound language solution;

FIG. 13F is a schematic depiction of the ambiguous input of FIG. 13 in accordance with another compound language solution;

FIG. 13G is a schematic depiction of the ambiguous input of FIG. 13 in accordance with another compound language solution;

FIG. 14 is a schematic depiction of an output of a representation of at least a portion of a compound language solution;

FIGS. 15A, 15B, and 15C are another exemplary flowchart depicting certain aspects of a method that can be executed on the handheld electronic device; and FIG. 16 is a schematic depiction of another ambiguous input to the handheld electronic device of FIG. 1.

Similar numerals refer to similar parts throughout the specification.

DESCRIPTION

Figure 1:
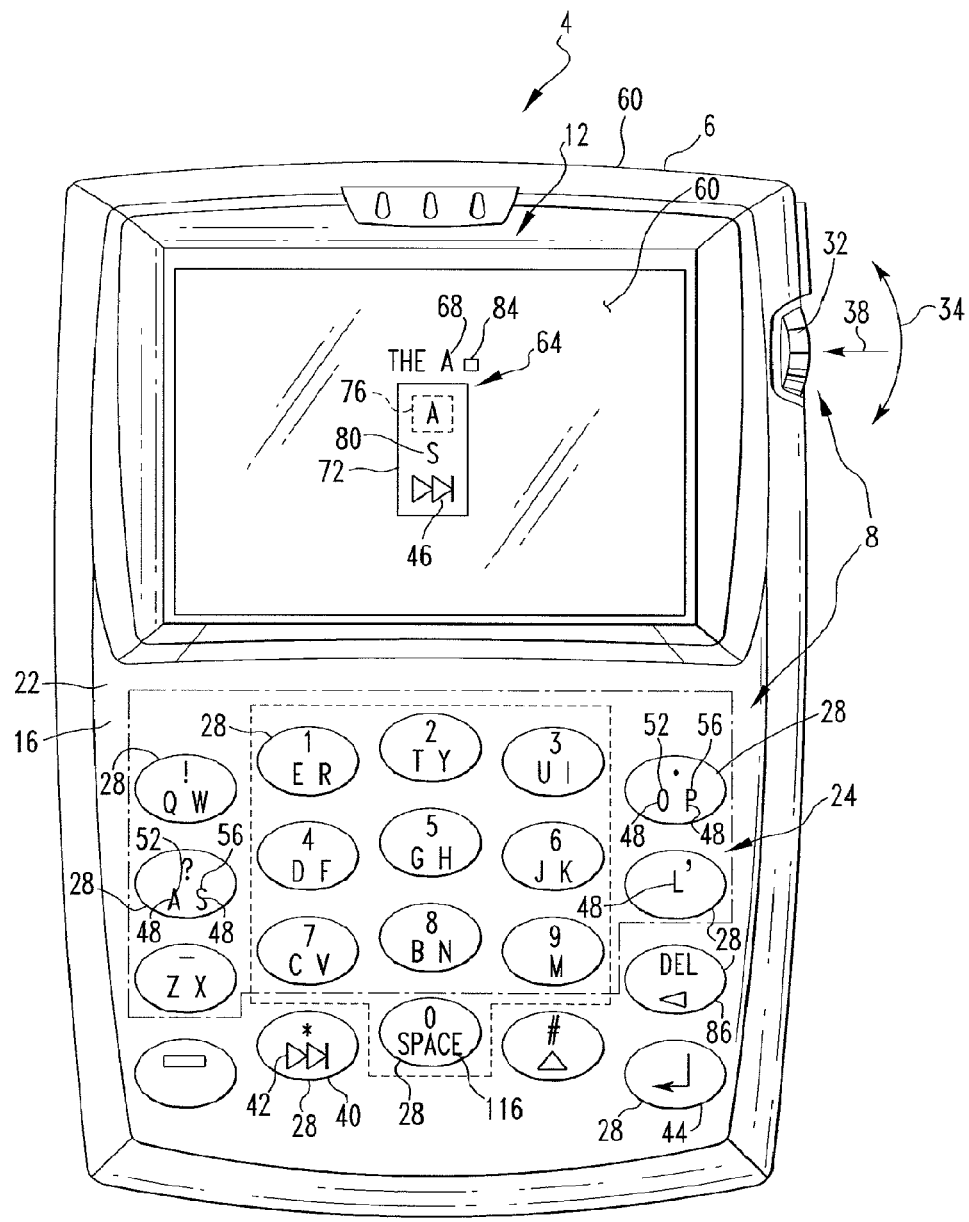
FIG. 1 is a top plan view of an improved handheld electronic device in accordance with the disclosed and claimed concept.
Figure 2:
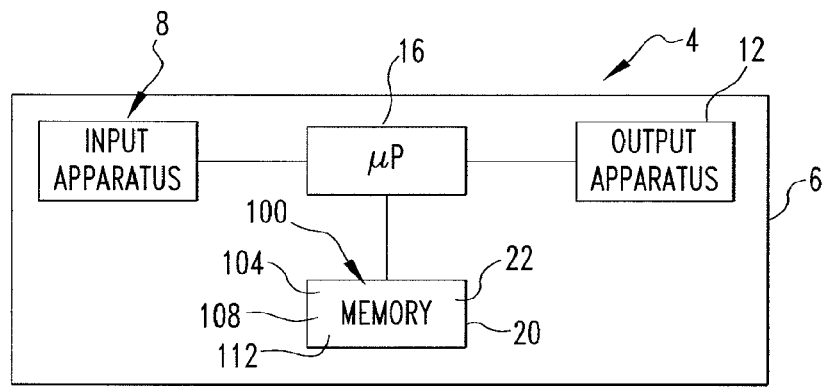
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, a memory 20, and at least a first routine. The processor 16 may be, for instance, and without limitation, a microprocessor (μP) and is responsive to inputs from the input apparatus 8 and provides output signals to the output apparatus 12. The processor 16 also interfaces with the memory 20. The processor 16 and the memory 20 together form a processor apparatus. Examples of handheld electronic devices are included in U.S. Pat. Nos. 6,452,588 and 6,489,950, which are incorporated by record herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other configurations, such as an AZERTY keyboard, a QWERTZ keyboard, or other keyboard arrangement, whether presently known or unknown, and either reduced or not reduced. As employed herein, the expression "reduced" and variations thereof in the context of a keyboard, a keypad, or other arrangement of input members, shall refer broadly to an arrangement in which at least one of the input members has assigned thereto a plurality of linguistic elements such as, for example, characters in the set of Latin letters, whereby an actuation of the at least one of the input members, without another input in combination therewith, is an ambiguous input since it could refer to more than one of the plurality of linguistic elements assigned thereto. As employed herein, the expression "linguistic element" and variations thereof shall refer broadly to any element that itself can be a language object or from which a language object can be constructed, identified, or otherwise obtained, and thus would include, for example and without limitation, characters, letters, strokes, ideograms, phonemes, morphemes, digits, and the like. As employed herein, the expression "language object" and variations thereof shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

The system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation. As will be described in greater detail below, the <NEXT> key 40 additionally and advantageously includes a graphic 42 disposed thereon, and in certain circumstances the output apparatus 12 also displays a displayed graphic 46 thereon to identify the <NEXT> key 40 as being able to provide a selection input to the processor 16. In this regard, the displayed graphic 46 of the output apparatus 12 is substantially similar to the graphic 42 on the <NEXT> key and thus identifies the <NEXT> key 40 as being capable of providing a desirable selection input to the processor 16.

As can further be seen in FIG. 1, many of the keys 28 include a number of linguistic elements 48 disposed thereon. As employed herein, the expression "a number of" and variations thereof shall refer broadly to any quantity, including a quantity of one, and in certain circumstances herein can also refer to a quantity of zero. In the exemplary depiction of the keypad 24, many of the keys 28 include two linguistic elements, such as including a first linguistic element 52 and a second linguistic element 56 assigned thereto.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

The output apparatus 12 includes a display 60 upon which can be provided an output 64. An exemplary output 64 is depicted on the display 60 in FIG. 1. The output 64 includes a text component 68 and a variant component 72. The variant component 72 includes a default portion 76 and a variant portion 80. The display also includes a caret 84 that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. The displayed graphic 46 typically is provided in the variant component 72 in the vicinity of the variant portion 80, although it is understood that the displayed graphic 46 could be provided in other locations and in other fashions. It is also noted that the exemplary variant portion 80 is depicted herein as extending vertically below the default portion 76, but it is understood that numerous other arrangements could be provided.

Among the keys 28 of the keypad 24 additionally is a <DELETE> key 86 that can be provided to delete a text entry. As will be described in greater detail below, the <DELETE> key 86 can also be employed in providing an alternation input to the processor 16 for use by the disambiguation function.

Figure 2A:
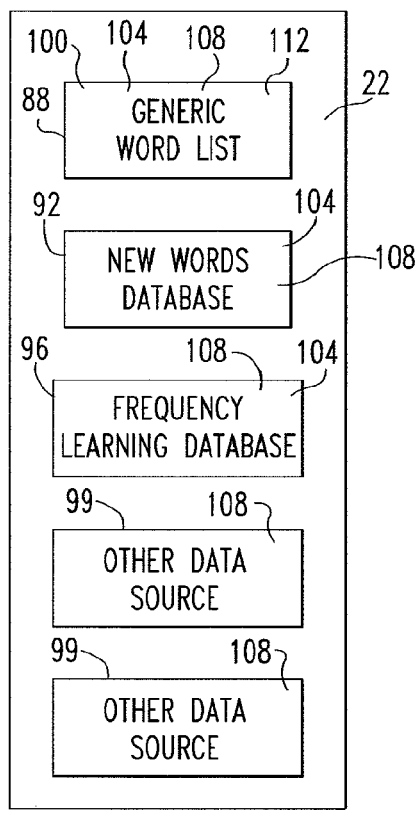
FIG. 2A is a schematic depiction of a portion of the handheld electronic device of FIG. 2.

The memory 20 is depicted schematically in FIG. 2A. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. As will be explained in greater detail below, the routines 22 include the aforementioned disambiguation function as an application, as well as other routines.

As can be understood from FIG. 2A, the memory 20 additionally includes data stored and/or organized in a number of tables, sets, lists, and/or otherwise. Specifically, the memory 20 includes a generic word list 88, a new words database 92, and a frequency learning database 96. Stored within the various areas of the memory 20 are a number of language objects 100 and frequency objects 104. The language objects 100 generally are each associated with an associated frequency object 104. The language objects 100 include, in the present exemplary embodiment, a plurality of word objects 108 and a plurality of N-gram objects 112. The word objects 108 are generally representative of complete words within the language or custom words stored in the memory 20. For instance, if the language stored in the memory 20 is, for example, English, generally each word object 108 would represent a word in the English language or would represent a custom word.

Associated with substantially each word object 108 is a frequency object 104 having frequency value that is indicative of the relative frequency within the relevant language of the given word represented by the word object 108. In this regard, the generic word list 88 includes a corpus of word objects 108 and associated frequency objects 104 that together are representative of a wide variety of words and their relative frequency within a given vernacular of, for instance, a given language. The generic word list 88 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 112 stored within the generic word list 88 are short strings of characters within the relevant language typically, for example, one to three characters in length, and typically represent word fragments within the relevant language, although certain of the N-gram objects 112 additionally can themselves be words. However, to the extent that an N-gram object 112 also is a word within the relevant language, the same word likely would be separately stored as a word object 108 within the generic word list 88. As employed herein, the expression "string" and variations thereof shall refer broadly to an object having one or more characters or components, and can refer to any of a complete word, a fragment of a word, a custom word or expression, and the like.

In the present exemplary embodiment of the handheld electronic device 4, the N-gram objects 112 include 1-gram objects, i.e., string objects that are one character in length, 2-gram objects, i.e., string objects that are two characters in length, and 3-gram objects, i.e., string objects that are three characters in length, all of which are collectively referred to as N-grams 112. Substantially each N-gram object 112 in the generic word list 88 is similarly associated with an associated frequency object 104 stored within the generic word list 88, but the frequency object 104 associated with a given N-gram object 112 has a frequency value that indicates the relative probability that the character string represented by the particular N-gram object 112 exists at any location within any word of the relevant language. The N-gram objects 112 and the associated frequency objects 104 are a part of the corpus of the generic word list 88 and are obtained in a fashion similar to the way in which the word object 108 and the associated frequency objects 104 are obtained, although the analysis performed in obtaining the N-gram objects 112 will be slightly different because it will involve analysis of the various character strings within the various words instead of relying primarily on the relative occurrence of a given word.

The present exemplary embodiment of the handheld electronic device 4, with its exemplary language being the English language, includes twenty-six 1-gram N-gram objects 112, i.e., one 1-gram object for each of the twenty-six letters in the Latin alphabet upon which the English language is based, and further includes 676 2-gram N-gram objects 112, i.e., twenty-six squared, representing each two-letter permutation of the twenty-six letters within the Latin alphabet.

The N-gram objects 112 also include a certain quantity of 3-gram N-gram objects 112, primarily those that have a relatively high frequency within the relevant language. The exemplary embodiment of the handheld electronic device 4 includes fewer than all of the three-letter permutations of the twenty-six letters of the Latin alphabet due to considerations of data storage size, and also because the 2-gram N-gram objects 112 can already provide a meaningful amount of information regarding the relevant language. As will be set forth in greater detail below, the N-gram objects 112 and their associated frequency objects 104 provide frequency data that can be attributed to character strings for which a corresponding word object 108 cannot be identified or has not been identified, and typically is employed as a fallback data source, although this need not be exclusively the case.

In the present exemplary embodiment, the language objects 100 and the frequency objects 104 are maintained substantially inviolate in the generic word list 88, meaning that the basic language corpus remains substantially unaltered within the generic word list 88, and the learning functions that are provided by the handheld electronic device 4 and that are described below operate in conjunction with other objects that are generally stored elsewhere in memory 20, such as, for example, in the new words database 92 and the frequency learning database 96.

The new words database 92 and the frequency learning database 96 store additional word objects 108 and associated frequency objects 104 in order to provide to a user a customized experience in which words and the like that are used relatively more frequently by a user will be associated with relatively higher frequency values than might otherwise be reflected in the generic word list 88. More particularly, the new words database 92 includes word objects 108 that are user-defined and that generally are not found among the word objects 108 of the generic word list 88. Each word object 108 in the new words database 92 has associated therewith an associated frequency object 104 that is also stored in the new words database 92. The frequency learning database 96 stores word objects 108 and associated frequency objects 104 that are indicative of relatively more frequent usage of such words by a user than would be reflected in the generic word list 88. As such, the new words database 92 and the frequency learning database 96 provide two learning functions, that is, they together provide the ability to learn new words as well the ability to learn altered frequency values for known words.

Figure 3A:
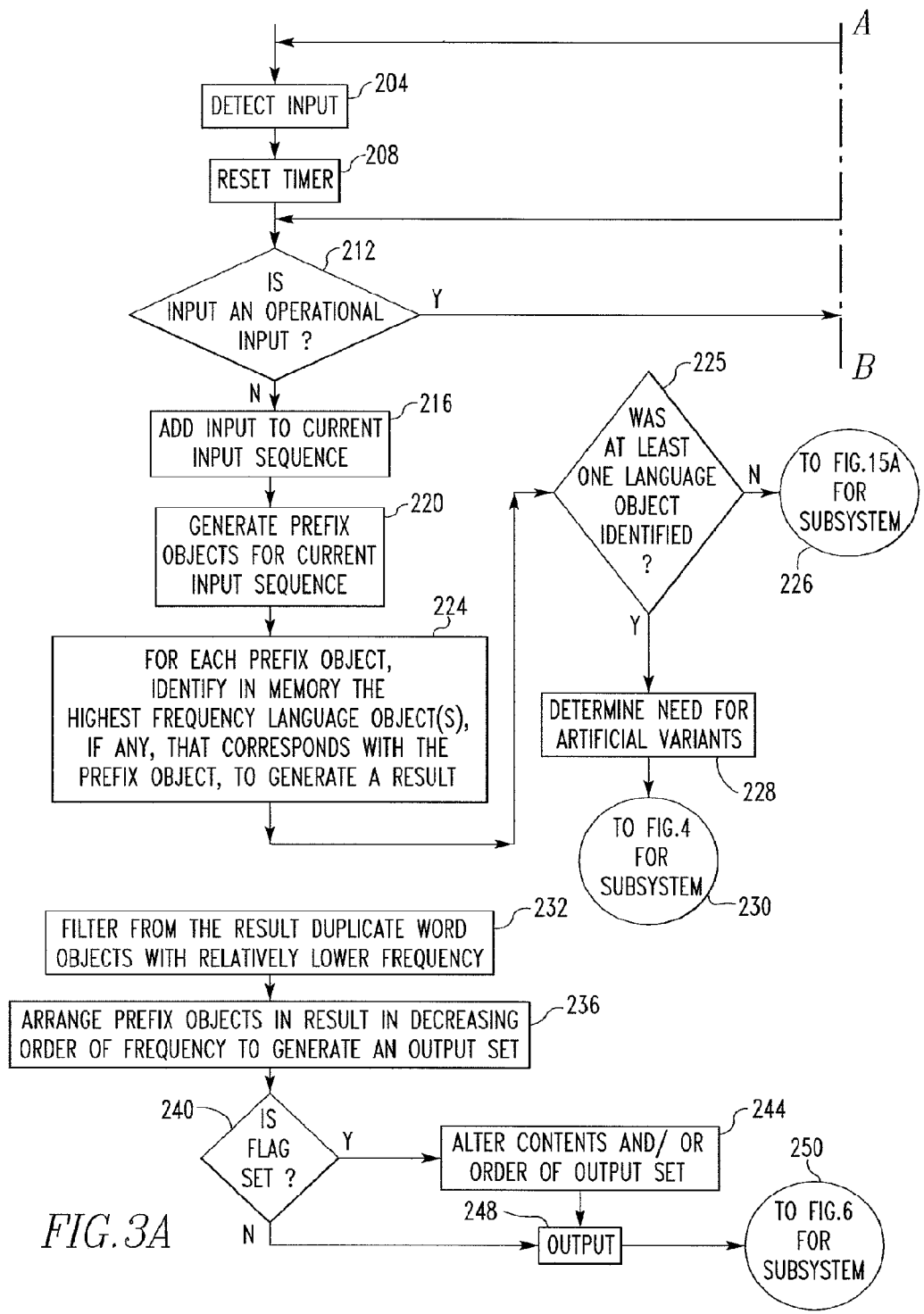
FIGS. 3A and 3B are an exemplary flowchart depicting certain aspects of a disambiguation function that can be executed on the handheld electronic device of FIG. 1.
Figure 3B:
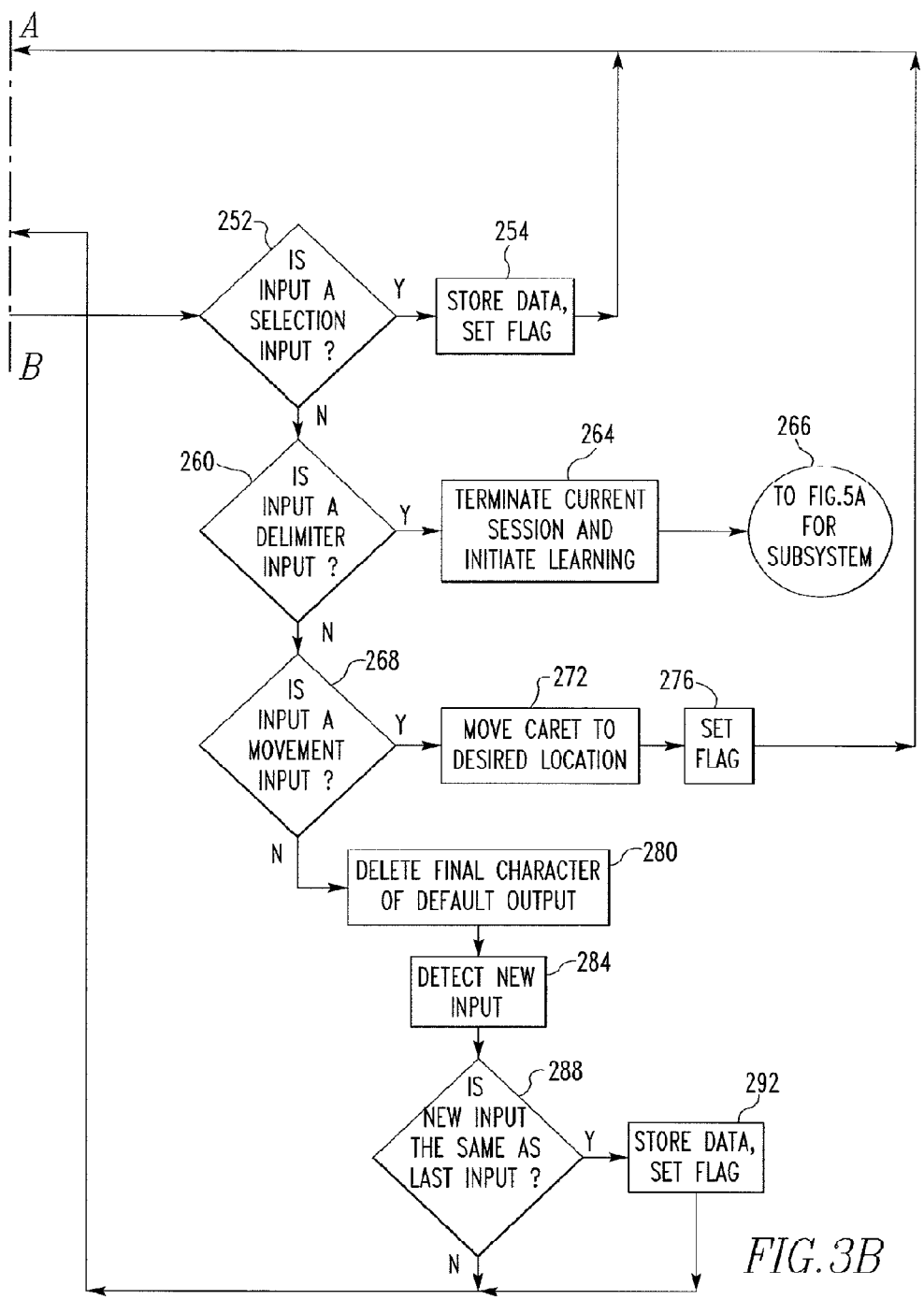

FIGS. 3A and 3B depict in an exemplary fashion the general operation of certain aspects of the disambiguation function of the handheld electronic device 4. Additional features, functions, and the like are depicted and described elsewhere.

An input is detected, as at 204, and the input can be any type of actuation or other operation as to any portion of the input apparatus 8. A typical input would include, for instance, an actuation of a key 28 having a number of characters 48 thereon, or any other type of actuation or manipulation of the input apparatus 8.

Upon detection at 204 of an input, a timer is reset at 208. The use of the timer will be described in greater detail below.

The disambiguation function then determines, as at 212, whether the current input is an operational input, such as a selection input, a delimiter input, a movement input, an alternation input, or, for instance, any other input that does not constitute an actuation of a key 28 having a number of characters 48 thereon. If the input is determined at 212 to not be an operational input, processing continues at 216 by adding the input to the current input sequence which may or may not already include an input.

Many of the inputs detected at 204 are employed in generating input sequences as to which the disambiguation function will be executed. An input sequence is built up in each "session" with each actuation of a key 28 having a number of characters 48 thereon. Since an input sequence typically will be made up of at least one actuation of a key 28 having a plurality of characters 48 thereon, the input sequence will be ambiguous. When a word, for example, is completed the current session is ended and a new session is initiated.

An input sequence is gradually built up on the handheld electronic device 4 with each successive actuation of a key 28 during any given session. Specifically, once a delimiter input is detected during any given session, the session is terminated and a new session is initiated. Each input resulting from an actuation of one of the keys 28 having a number of the characters 48 associated therewith is sequentially added to the current input sequence. As the input sequence grows during a given session, the disambiguation function generally is executed with each actuation of a key 28, i.e., an input, and as to the entire input sequence, Stated otherwise, within a given session, the growing input sequence is attempted to be disambiguated as a unit by the disambiguation function with each successive actuation of the various keys 28.

Once a current input representing a most recent actuation of the one of the keys 28 having a number of the characters 48 assigned thereto has been added to the current input sequence within the current session, as at 216 in FIG. 3A, the disambiguation function generates, as at 220, substantially all of the permutations of the characters 48 assigned to the various keys 28 that were actuated in generating the input sequence. In this regard, the "permutations" refer to the various strings that can result from the characters 48 of each actuated key 28 limited by the order in which the keys 28 were actuated. The various permutations of the characters in the input sequence are employed as prefix objects.

For instance, if the current input sequence within the current session is the ambiguous input of the keys "AS" and "OP", the various permutations of the first character 52 and the second character 56 of each of the two keys 28, when considered in the sequence in which the keys 28 were actuated, would be "SO", "SP", "AP", and "AO", and each of these is a prefix object that is generated, as at 220, with respect to the current input sequence. As will be explained in greater detail below, the disambiguation function seeks to identify for each prefix object one of the word objects 108 for which the prefix object would be a prefix.

For each generated prefix object, the memory 20 is consulted, as at 224, to identify, if possible, for each prefix object one of the word objects 108 in the memory 20 that corresponds with the prefix object, meaning that the sequence of letters represented by the prefix object would be either a prefix of the identified word object 108 or would be substantially identical to the entirety of the word object 108. Further in this regard, the word object 108 that is sought to be identified is the highest frequency word object 108. That is, the disambiguation function seeks to identify the word object 108 that corresponds with the prefix object and that also is associated with a frequency object 104 having a relatively higher frequency value than any of the other frequency objects 104 associated with the other word objects 108 that correspond with the prefix object.

It is noted in this regard that the word objects 108 in the generic word list 88 are generally organized in data tables that correspond with the first two letters of various words. For instance, the data table associated with the prefix "CO" would include all of the words such as "CODE", "COIN", "COMMUNICATION", and the like. Depending upon the quantity of word objects 108 within any given data table, the data table may additionally include sub-data tables within which word objects 108 are organized by prefixes that are three characters or more in length. Continuing onward with the foregoing example, if the "CO" data table included, for instance, more than 256 word objects 108, the "CO" data table would additionally include one or more sub-data tables of word objects 108 corresponding with the most frequently appearing three-letter prefixes. By way of example, therefore, the "CO" data table may also include a "COM" sub-data table and a "CON" sub-data table. If a sub-data table includes more than the predetermined number of word objects 108, for example a quantity of 256, the sub-data table may include further sub-data tables, such as might be organized according to four letter prefixes. It is noted that the aforementioned quantity of 256 of the word objects 108 corresponds with the greatest numerical value that can be stored within one byte of the memory 20.

Accordingly, when, at 224, each prefix object is sought to be used to identify a corresponding word object 108, and for instance the instant prefix object is "AP", the "AP" data table will be consulted. Since all of the word objects 108 in the "AP" data table will correspond with the prefix object "AP", the word object 108 in the "AP" data table with which is associated a frequency object 104 having a frequency value relatively higher than any of the other frequency objects 104 in the "AP" data table is identified. The identified word object 108 and the associated frequency object 104 are then stored in a result register that serves as a result of the various comparisons of the generated prefix objects with the contents of the memory 20.

It is noted that one or more, or possibly all, of the prefix objects will be prefix objects for which a corresponding word object 108 is not identified in the memory 20. Such prefix objects are considered to be orphan prefix objects and are separately stored or are otherwise retained for possible future use. In this regard, it is noted that many or all of the prefix objects can become orphan objects if, for instance, the user is trying to enter a new word or, for example, if the user has mis-keyed and no word corresponds with the mis-keyed input.

Once the result has been obtained at 224, the disambiguation function 22 determines, as at 225, whether at least one language object 100 was identified as corresponding with a prefix object. If not, processing continues as at 226 where processing branches to FIG. 15A, which is discussed in greater detail elsewhere herein. If it is determined at 225 that at least one language object 100 was identified as corresponding with a prefix object, processing continues at 228 where the disambiguation routine 22 begins to determine whether artificial variants should be generated.

Figure 4:
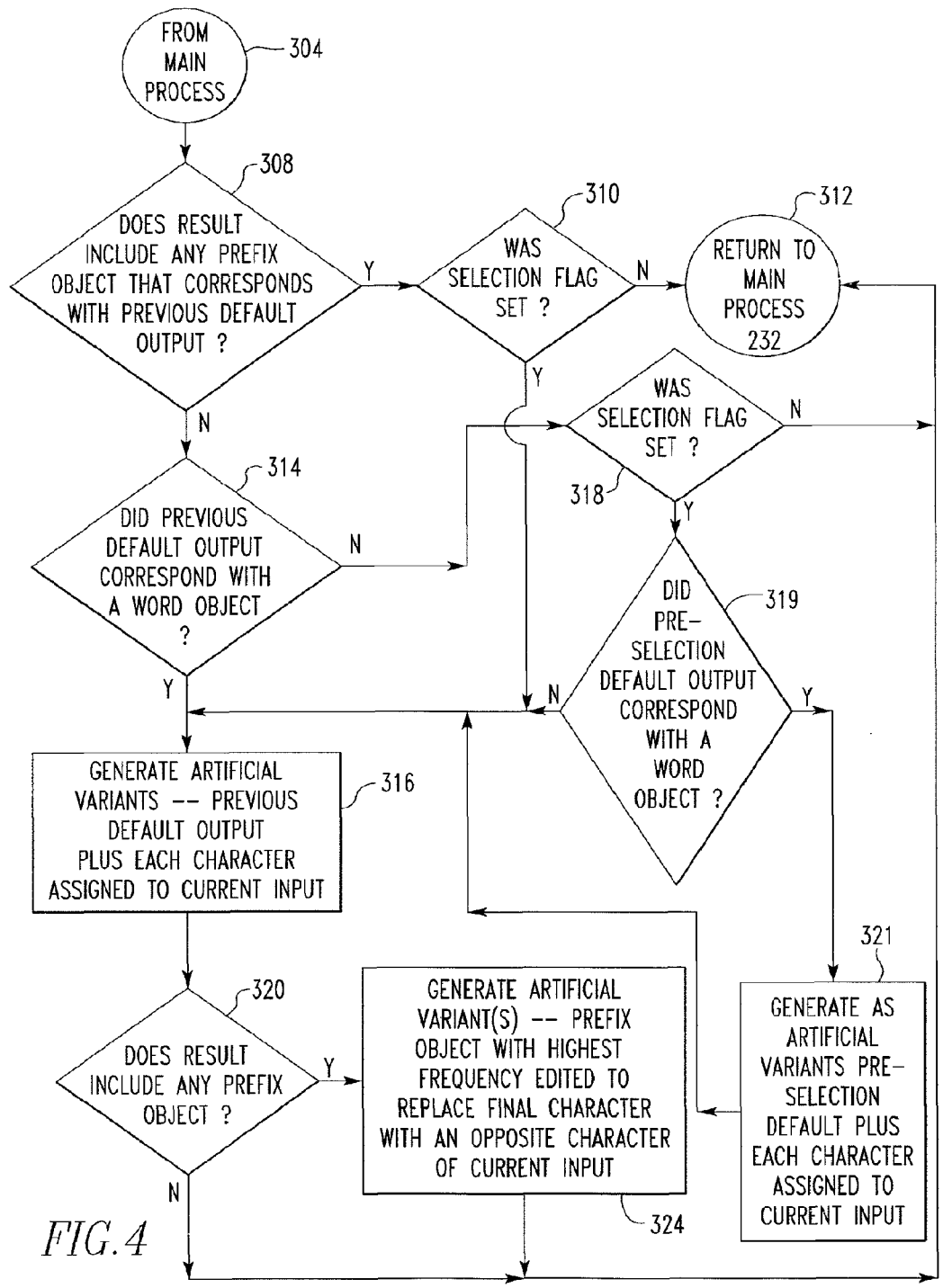
FIG. 4 is another exemplary flowchart depicting certain aspects of a disambiguation function that can be executed on the handheld electronic device by which certain output variants can be provided to the user.

In order to determine the need for artificial variants, the process at 228 branches, as at 230, to the artificial variant process depicted generally in FIG. 4 and beginning with the numeral 304. The disambiguation function then determines, as at 308, whether any of the prefix objects in the result correspond with what had been the default output 76 prior to detection of the current key input. If a prefix object in the result corresponds with the previous default output, this means that the current input sequence corresponds with a word object 108 and, necessarily, the previous default output also corresponded with a word object 108 during the previous disambiguation cycle within the current session.

If it is determined at 308 that a prefix object in the result corresponds with what had been the default output 76 prior to detection of the current key input, the next point of analysis is to determine, as at 310, whether the previous default output was made the default output because of a selection input, such as would have caused the setting of a flag, such as at 254 of FIG. 3B, discussed in greater detail elsewhere herein. In the event that the previous default output was not the result of a selection input, meaning that no flag was set, no artificial variants are needed, and the process returns, as at 312, to the main process at 232. However, if it is determined at 310 that the previous default output was the result of a selection input, then artificial variants are generated, as at 316.

More specifically, each of the artificial variants generated at 316 include the previous default output plus one of the characters 48 assigned to the key 28 of the current input. As such, if the key 28 of the current input has two characters, i.e., a first character 52 and a second character 56, two artificial variants will be generated at 316. One of the artificial variants will include the previous default output plus the first character 52. The other artificial variant will include the previous default output plus the second character 56.

However, if it is determined at 308 that none of the prefix objects in the result correspond with the previous default output, it is next necessary to determine, as at 314, whether the previous default output had corresponded with a word object 108 during the previous disambiguation cycle within the current session. If the answer to the inquiry at 314 is no, it is still necessary to determine, as at 318, whether the previous default output was made the default output because of a selection input, such as would have caused the setting of the flag. In the event that the previous default output was not the result of a selection input, no artificial variants are needed, and the process returns, as at 312, to the main process at 232.

However, if it is determined at 318 that the previous default output was the result of a selection input, it is necessary to next determine as at 319 whether the pre-selection default output, i.e., what had been the default output prior to the selection input that was identified at 318, corresponded with a word object 108. If so, artificial variants are created, as at 321, for the pre-selection default output plus each of the linguistic elements assigned to the key 28 of the current input. Processing thereafter continues to 316 where artificial variants are generated for the previous default output plus the linguistic elements assigned to the key 28 of the current input. Alternatively, if at 319 it is determined that the pre-selection default output did not correspond with a word object 108, processing continues directly to 316 where artificial variants are generated for the previous default output plus the linguistic elements assigned to the key 28 of the current input.

On the other hand, if it is determined that the answer to the inquiry at 314 is yes, meaning that the previous default output had corresponded with a word object, but with the current input the previous default output combined with the current input has ceased to correspond with any word object 108, then artificial variants are generated, again as at 316.

After the artificial variants are generated at 316, the method then determines, as at 320, whether the result includes any prefix objects at all. If not, processing returns, as at 312, to the main process at 232. However, if it is determined at 320 that the result includes at least a first prefix object, meaning that the current input sequence corresponds with a word object 108, processing is transferred to 324 where an additional artificial variant is created. Specifically, the prefix object of the result with which is associated the frequency object 104 having the relatively highest frequency value among the other frequency objects 104 in the result is identified, and the artificial variant is created by deleting the final character from the identified prefix object and replacing it with an opposite character 48 on the same key 28 of the current input that generated the final character 48 of the identified prefix object. In the event that the specific key 28 has more than two characters 48 assigned thereto, each such opposite character 48 will be used to generate an additional artificial variant.

Once the need for artificial variants has been identified, as at 228, and such artificial variants have been generated, as in FIG. 4 and as described above, processing continues, as at 232, where duplicate word objects 108 associated with relatively lower frequency values are deleted from the result. Such a duplicate word object 108 could be generated, for instance, by the frequency learning database 96, as will be set forth in greater detail below. If a word object 108 in the result matches one of the artificial variants, the word object 108 and its associated frequency object 104 generally will be removed from the result because the artificial variant will be assigned a preferred status in the output 64, likely in a position preferred to any word object 108 that might have been identified.

Once the duplicate word objects 108 and the associated frequency objects 104 have been removed at 232, the remaining prefix objects are arranged, as at 236, in an output set in decreasing order of frequency value. The orphan prefix objects mentioned above may also be added to the output set, albeit at positions of relatively lower frequency value than any prefix object for which a corresponding word object 108 was found. It is also necessary to ensure that the artificial variants, if they have been created, are placed at a preferred position in the output set. It is understood that artificial variants may, but need not necessarily be, given a position of preference, i.e., assigned a relatively higher priority or frequency, than prefix objects of the result.

If it is determined, as at 240, that the flag has been set, meaning that a user has made a selection input, either through an express selection input or through an alternation input of a movement input, then the default output 76 is considered to be "locked," meaning that the selected variant will be the default prefix until the end of the session. If it is determined at 240 that the flag has been set, the processing will proceed to 244 where the contents of the output set will be altered, if needed, to provide as the default output 76 an output that includes the selected prefix object, whether it corresponds with a word object 108 or is an artificial variant. In this regard, it is understood that the flag can be set additional times during a session, in which case the selected prefix associated with resetting of the flag thereafter becomes the "locked" default output 76 until the end of the session or until another selection input is detected.

Figure 6:
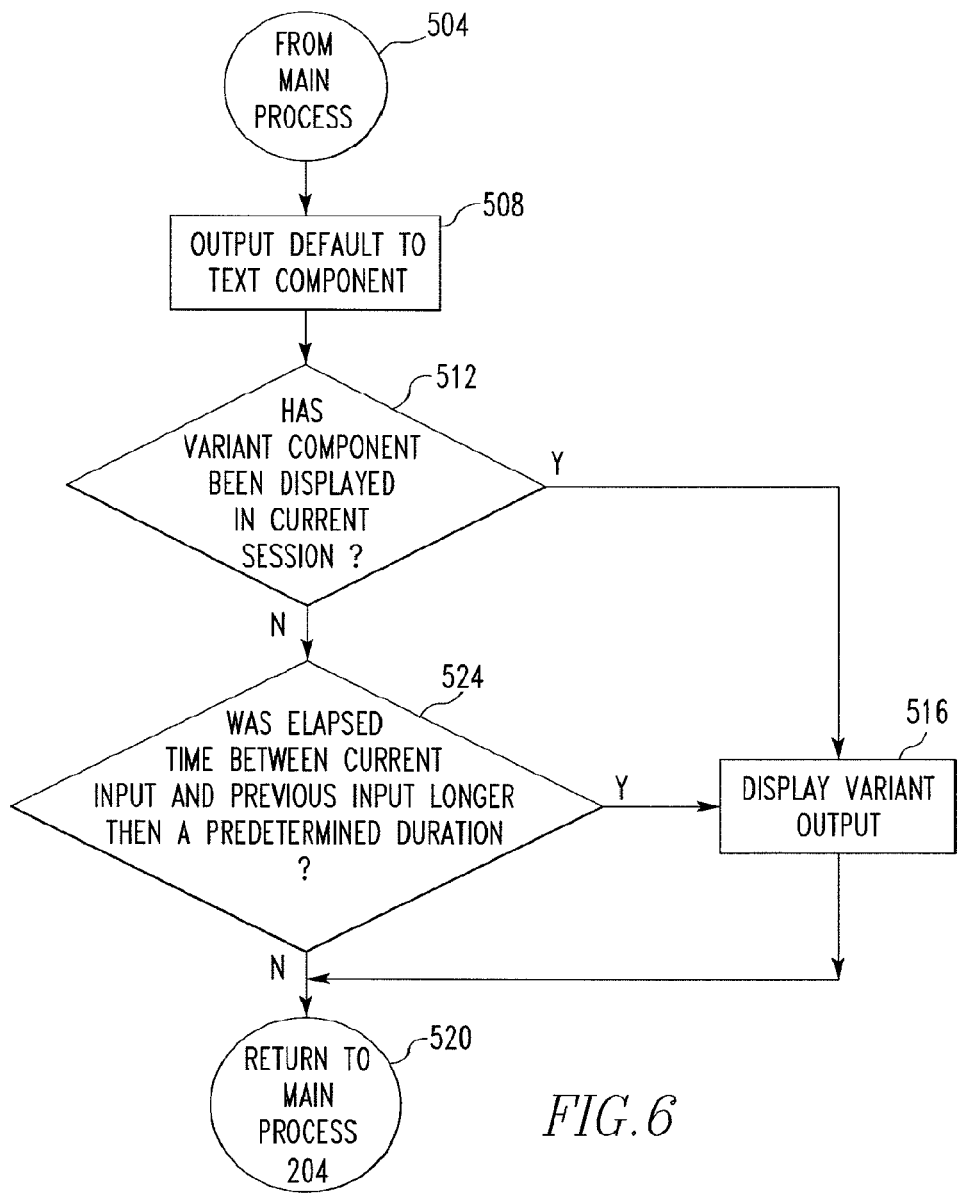
FIG. 6 is another exemplary flowchart depicting certain aspects of a method by which various display formats can be provided on the handheld electronic device.

Processing then continues, as at 248, to an output step after which an output 64 is generated as described above. More specifically, processing proceeds, as at 250, to the subsystem depicted generally in FIG. 6 and described below. Processing thereafter continues at 204 where additional input is detected. On the other hand, if it is determined at 240 that the flag had not been set, then processing goes directly to 248 without the alteration of the contents of the output set at 244.

The handheld electronic device 4 may be configured such that any orphan prefix object that is included in an output 64 but that is not selected with the next input is suspended. This may be limited to orphan prefix objects appearing in the variant portion 80 or may apply to orphan prefix objects anywhere in the output 64. The handheld electronic device 4 may also be configured to similarly suspend artificial variants in similar circumstances. A reason for such suspension is that each such orphan prefix object and/or artificial variant, as appropriate, may spawn a quantity of offspring orphan prefix objects equal to the quantity of characters 48 on a key 28 of the next input. That is, each offspring will include the parent orphan prefix object or artificial variant plus one of the characters 48 of the key 28 of the next input. Since orphan prefix objects and artificial variants substantially do not have correspondence with a word object 108, spawned offspring objects from parent orphan prefix objects and artificial variants likewise will not have correspondence with a word object 108. Such suspended orphan prefix objects and/or artificial variants may be considered to be suspended, as compared with being wholly eliminated, since such suspended orphan prefix objects and/or artificial variants may reappear later as parents of a spawned orphan prefix objects and/or artificial variants, as will be explained below.

If the detected input is determined, as at 212, to be an operational input, processing then continues to determine the specific nature of the operational input. For instance, if it is determined, as at 252, that the current input is a selection input, processing continues at 254. At 254, the word object 108 and the associated frequency object 104 of the default portion 76 of the output 64, as well as the word object 108 and the associated frequency object 104 of the portion of the variant output 80 that was selected by the selection input, are stored in a temporary learning data register. Additionally, the flag is set. Processing then returns to detection of additional inputs as at 204.

Figure 5A:
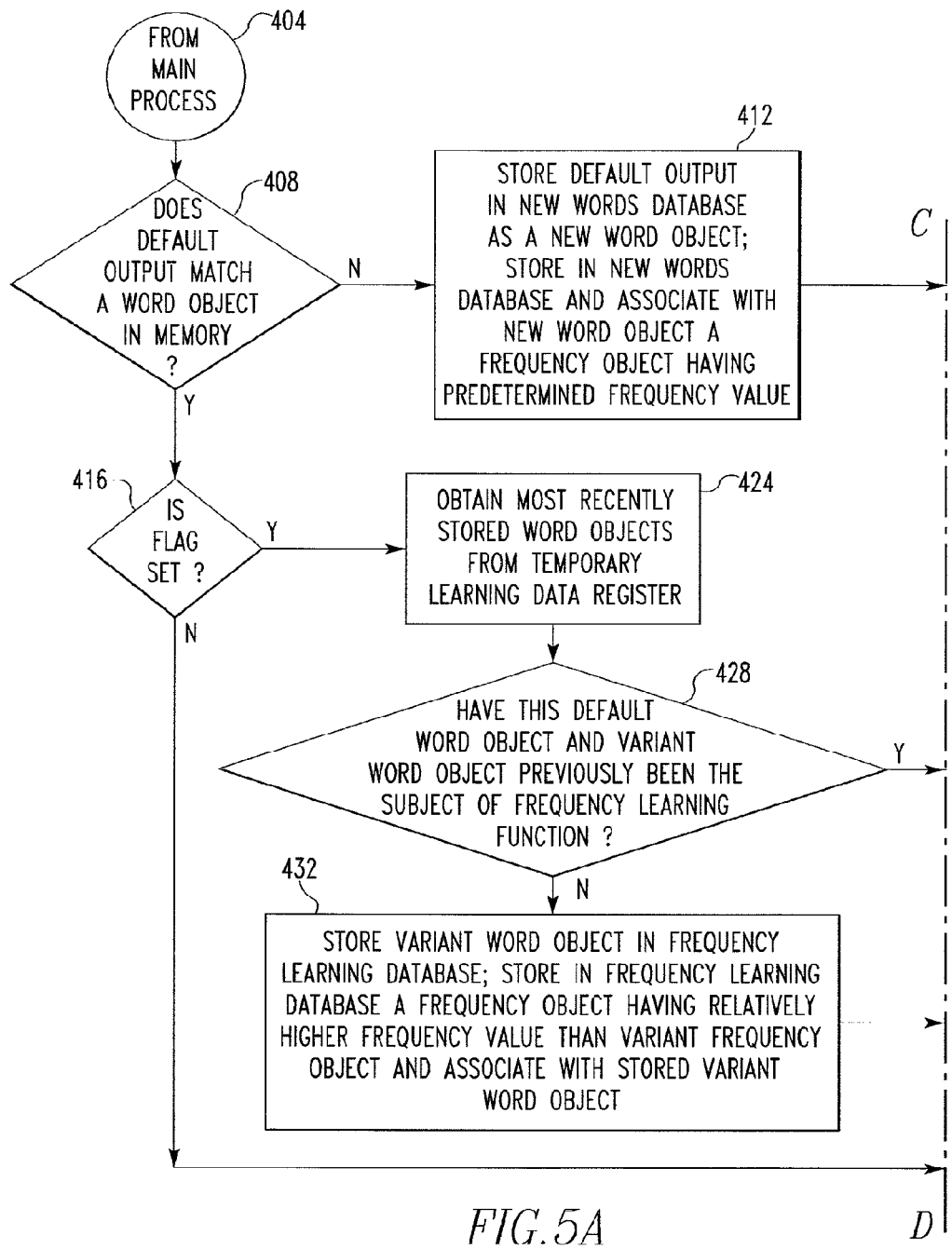
FIGS. 5A and 5B are another exemplary flowchart depicting certain aspects of a learning method that can be executed on the handheld electronic device.

If it is determined, as at 260, that the input is a delimiter input, processing continues at 264 where the current session is terminated and processing is transferred, as at 266, to the learning function subsystem, as at 404 of FIG. 5A. A delimiter input would include, for example, the actuation of a <SPACE> key 116, which would both enter a delimiter symbol and would add a space at the end of the word, actuation of the <ENTER> key 44, which might similarly enter a delimiter input and enter a space, and by a translation of the thumbwheel 32, such as is indicated by the arrow 38, which might enter a delimiter input without additionally entering a space.

It is first determined, as at 408, whether the default output at the time of the detection of the delimiter input at 260 matches a word object 108 in the memory 20. If it does not, this means that the default output is a user-created output that should be added to the new words database 92 for future use. In such a circumstance processing then proceeds to 412 where the default output is stored in the new words database 92 as a new word object 108. Additionally, a frequency object 104 is stored in the new words database 92 and is associated with the aforementioned new word object 108. The new frequency object 104 is given a relatively high frequency value, typically within the upper one-fourth or one-third of a predetermined range of possible frequency values.

In this regard, frequency objects 104 are given an absolute frequency value generally in the range of zero to 65,535. The maximum value represents the largest number that can be stored within two bytes of the memory 20. The new frequency object 104 that is stored in the new words database 92 is assigned an absolute frequency value within the upper one-fourth or one-third of this range, particularly since the new word was used by a user and is likely to be used again.

With further regard to frequency object 104, it is noted that within a given data table, such as the "CO" data table mentioned above, the absolute frequency value is stored only for the frequency object 104 having the highest frequency value within the data table. All of the other frequency objects 104 in the same data table have frequency values stored as percentage values normalized to the aforementioned maximum absolute frequency value. That is, after identification of the frequency object 104 having the highest frequency value within a given data table, all of the other frequency objects 104 in the same data table are assigned a percentage of the absolute maximum value, which represents the ratio of the relatively smaller absolute frequency value of a particular frequency object 104 to the absolute frequency value of the aforementioned highest value frequency object 104. Advantageously, such percentage values can be stored within a single byte of memory, thus saving storage space within the handheld electronic device 4.

Upon creation of the new word object 108 and the new frequency object 104, and storage thereof within the new words database 92, processing is transferred to 420 where the learning process is terminated. Processing is then returned to the main process, as at 204.

If at 408 it is determined that the word object 108 in the default output 76 matches a word object 108 within the memory 20, processing then continues at 416 where it is determined whether the aforementioned flag has been set, such as occurs upon the detection of a selection input, and alternation input, or a movement input, by way of example. If it turns out that the flag has not been set, this means that the user has not expressed a preference for a variant prefix object over a default prefix object, and no need for frequency learning has arisen. In such a circumstance, processing continues at 420 where the learning process is terminated. Processing then returns to the main process at 204.

However, if it is determined at 416 that the flag has been set, the processor 20 retrieves from the temporary learning data register the most recently saved default and variant word objects 108, along with their associated frequency objects 104. It is then determined, as at 428, whether the default and variant word objects 108 had previously been subject of a frequency learning operation. This might be determined, for instance, by determining whether the variant word object 108 and the associated frequency object 104 were obtained from the frequency learning database 96. If the default and variant word objects 108 had not previously been the subject of a frequency learning operation, processing continues, as at 432, where the variant word object 108 is stored in the frequency learning database 96, and a revised frequency object 104 is generated having a frequency value greater than that of the frequency object 104 that previously had been associated with the variant word object 108. In the present exemplary circumstance, i.e., where the default word object 108 and the variant word object 108 are experiencing their first frequency learning operation, the revised frequency object 104 may, for instance, be given a frequency value equal to the sum of the frequency value of the frequency object 104 previously associated with the variant word object 108 plus one-half the difference between the frequency value of the frequency object 104 associated with the default word object 108 and the frequency value of the frequency object 104 previously associated with the variant word object 108. Upon storing the variant word object 108 and the revised frequency object 104 in the frequency learning database 96, processing continues at 420 where the learning process is terminated and processing returns to the main process, as at 204.

If it is determined at 428 that that default word object 108 and the variant word object 108 had previously been the subject of a frequency learning operation, processing continues to 436 where the revised frequency value 104 is instead given a frequency value higher than the frequency value of the frequency object 104 associated with the default word object 108. After storage of the variant word object 108 and the revised frequency object 104 in the frequency learning database 96, processing continues to 420 where the learning process is terminated, and processing then returns to the main process, as at 204.

With further regard to the learning function, it is noted that the learning function additionally detects whether both the default word object 108 and the variant word object 104 were obtained from the frequency learning database 96. In this regard, when word objects 108 are identified, as at 224, for correspondence with generated prefix objects, all of the data sources in the memory are polled for such corresponding word objects 108 and corresponding frequency objects 104. Since the frequency learning database 96 stores word objects 108 that also are stored either in the generic word list 88 or the new words database 92, the word object 108 and the associated frequency object 104 that are obtained from the frequency learning database 96 typically are duplicates of word objects 108 that have already been obtained from the generic word list 88 or the new words database 92. However, the associated frequency object 104 obtained from the frequency learning database 96 typically has a frequency value that is of a greater magnitude than that of the associated frequency object 104 that had been obtained from the generic word list 88. This reflects the nature of the frequency learning database 96 as imparting to a frequently used word object 108 a relatively greater frequency value than it otherwise would have in the generic word list 88.

Figure 5B:
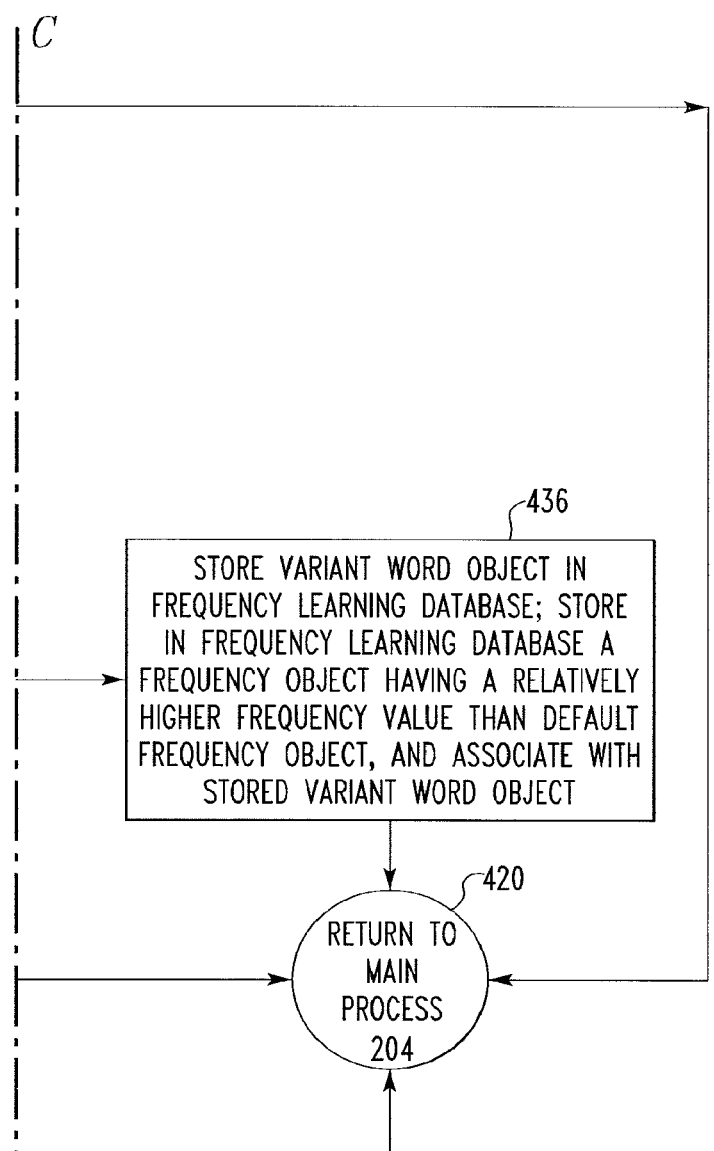

It thus can be seen that the learning function indicated in FIGS. 5A and 5B and described above is generally not initiated until a delimiter input is detected, meaning that learning occurs only once for each session. Additionally, if the final default output is not a user-defined new word, the word objects 108 that are the subject of the frequency learning function are the word objects 108 which were associated with the default output 76 and the selected variant output 80 at the time when the selection occurred, rather than necessarily being related to the object that ultimately resulted as the default output at the end of the session. Also, if numerous learnable events occurred during a single session, the frequency learning function operates only on the word objects 108 that were associated with the final learnable event, i.e., a selection event, an alternation event, or a movement event, prior to termination of the current session.

With further regard to the identification of various word objects 108 for correspondence with generated prefix objects, it is noted that the memory 20 can include a number of additional data sources 99 in addition to the generic word list 88, the new words database 92, and the frequency learning database 96, all of which can be considered linguistic sources. An exemplary two other data sources 99 are depicted in FIG. 2A, it being understood that the memory 20 might include any number of other data sources 99. The other data sources 99 might include, for example, an address database, a speed-text database, or any other data source without limitation. An exemplary speed-text database might include, for example, sets of words or expressions or other data that are each associated with, for example, a character string that may be abbreviated. For example, a speed-text database might associate the string "br" with the set of words "Best Regards", with the intention that a user can type the string "br" and receive the output "Best Regards".

In seeking to identify word objects 108 that correspond with a given prefix object, the handheld electronic device 4 may poll all of the data sources in the memory 20. For instance the handheld electronic device 4 may poll the generic word list 88, the new words database 92, the frequency learning database 96, and the other data sources 99 to identify word objects 108 that correspond with the prefix object. The contents of the other data sources 99 may be treated as word objects 108, and the processor 16 may generate frequency objects 104 that will be associated such word objects 108 and to which may be assigned a frequency value in, for example, the upper one-third or one-fourth of the aforementioned frequency range. Assuming that the assigned frequency value is sufficiently high, the string "br", for example, would typically be output to the display 60. If a delimiter input is detected with respect to the portion of the output having the association with the word object 108 in the speed-text database, for instance "br", the user would receive the output "Best Regards", it being understood that the user might also have entered a selection input as to the exemplary string "br".

The contents of any of the other data sources 99 may be treated as word objects 108 and may be associated with generated frequency objects 104 having the assigned frequency value in the aforementioned upper portion of the frequency range. After such word objects 108 are identified, the new word learning function can, if appropriate, act upon such word objects 108 in the fashion set forth above.

Again regarding FIG. 3A, when processing proceeds to the filtration step, as at 232, and the duplicate word objects 108 and the associated frequency objects 104 having relatively lower frequency values are filtered, the remaining results may include a variant word object 108 and a default word object 108, both of which were obtained from the frequency learning database 96. In such a situation, it can be envisioned that if a user repetitively and alternately uses one word then the other word, over time the frequency objects 104 associated with such words will increase well beyond the aforementioned maximum absolute frequency value for a frequency object 104. Accordingly, if it is determined that both the default word object 108 and the variant word object 108 in the learning function were obtained from the frequency learning database 96, instead of storing the variant word object 108 in the frequency learning database 96 and associating it with a frequency object 104 having a relatively increased frequency value, instead the learning function stores the default word object 108 and associates it with a revised frequency object 104 having a frequency value that is relatively lower than that of the frequency object 104 that is associated with the variant word object 108. Such a scheme advantageously avoids excessive and unnecessary increases in frequency value.

If it is determined, such as at 268, that the current input is a movement input, such as would be employed when a user is seeking to edit an object, either a completed word or a prefix object within the current session, the caret 84 is moved, as at 272, to the desired location, and the flag is set, as at 276. Processing then returns to where additional inputs can be detected, as at 204.

In this regard, it is understood that various types of movement inputs can be detected from the input device 8. For instance, a rotation of the thumbwheel 32, such as is indicated by the arrow 34 of FIG. 1, could provide a movement input, as could the actuation of the <NEXT> key 40, or other such input, potentially in combination with other devices in the input apparatus 8. In the instance where such a movement input is detected, such as in the circumstance of an editing input, the movement input is additionally detected as a selection input. Accordingly, and as is the case with a selection input such as is detected at 252, the selected variant is effectively locked with respect to the default portion 76 of the output 64. Any default output 76 during the same session will necessarily include the previously selected variant.

In the context of editing, however, the particular displayed object that is being edited is effectively locked except as to the character that is being edited. In this regard, therefore, the other characters of the object being edited, i.e., the characters that are not being edited, are maintained and are employed as a context for identifying additional word objects 108 and the like that correspond with the object being edited. Were this not the case, a user seeking to edit a letter in the middle of a word otherwise likely would see as a new output 64 numerous objects that bear little or no resemblance to the characters of the object being edited since, in the absence of maintaining such context, an entirely new set of prefix objects including all of the permutations of the characters of the various keystrokes of the object being edited would have been generated. New word objects 108 would have been identified as corresponding with the new prefix objects, all of which could significantly change the output 64 merely upon the editing of a single character. By maintaining the other characters currently in the object being edited, and employing such other characters as context information, the user can much more easily edit a word that is depicted on the display 60.

In the present exemplary embodiment of the handheld electronic device 4, if it is determined, as at 252, that the input is not a selection input, and it is determined, as at 260, that the input is not a delimiter input, and it is further determined, as at 268, that the input is not a movement input, in the current exemplary embodiment of the handheld electronic device 4 the only remaining operational input generally is a detection of the <DELETE> key 86 of the keys 28 of the keypad 24. Upon detection of the <DELETE> key 86, the final character of the default output is deleted, as at 280. At this point, the processing generally waits until another input is detected, as at 284. It is then determined, as at 288, whether the new input detected at 284 is the same as the most recent input that was related to the final character that had just been deleted at 280. If so, the default output 76 is the same as the previous default output, except that the last character is the opposite character of the key actuation that generated the last character. Processing then continues to 292 where learning data, i.e., the word object 108 and the associate frequency object 104 associated with the previous default output 76, as well as the word object 108 and the associate frequency object 104 associated with the new default output 76, are stored in the temporary learning data register and the flag is set. Such a key sequence, i.e., an input, the <DELETE> key 86, and the same input as before, is an alternation input. Such an alternation input replaces the default final character with an opposite final character of the key 28 which generated the final character 48 of the default output 76. The alternation input is treated as a selection input for purposes of locking the default output 76 for the current session, and also triggers the flag which will initiate the learning function upon detection of a delimiter input at 260.

If it turns out, however, that the system detects at 288 that the new input detected at 284 is different than the input immediately prior to detection of the <DELETE> key 86, processing continues at 212 where the input is determined to be either an operational input or an input of a key having one or more characters 48, and processing continues thereafter.

It is also noted that when the main process reaches the output stage at 248, an additional process is initiated which determines whether the variant component 72 of the output 64 should be initiated. Processing of the additional function is initiated from 250 at element 504 of FIG. 6. Initially, the method at 508 outputs the text component 68 of the output 64 to the display 60. Further processing determines whether or not the variant component 72 should be displayed.

Specifically, it is determined, as at 512, whether the variant component 72 has already been displayed during the current session. If the variant component 72 has already been displayed, processing continues at 516 where the new variant component 72 resulting from the current disambiguation cycle within the current session is displayed. Processing then returns to a termination point at 520, after which processing returns to the main process at 204. If, however, it is determined at 512 that the variant component 72 has not yet been displayed during the current session, processing continues, as at 524, to determine whether the elapsed time between the current input and the immediately previous input is longer than a predetermined duration. If it is longer, then processing continues at 516 where the variant component 72 is displayed and processing returns, through 520, to the main process, as at 204. However, if it is determined at 524 that the elapsed time between the current input and the immediately previous input is less than the predetermined duration, the variant component 72 is not displayed, and processing returns to the termination point at 520, after which processing returns to the main process, as at 204.

Advantageously, therefore, if a user is entering keystrokes relatively quickly, the variant component 72 will not be output to the display 60, where it otherwise would likely create a visual distraction to a user seeking to enter keystrokes quickly. If at any time during a given session the variant component 72 is output to the display 60, such as if the time between successive inputs exceeds the predetermined duration, the variant component 72 will continue to be displayed throughout that session. However, upon the initiation of a new session, the variant component 72 will be withheld from the display if the user consistently is entering keystrokes relatively quickly.

An exemplary input sequence is depicted in FIGS. 1 and 7-11. In this example, the user is attempting to enter the word "APPLOADER", and this word presently is not stored in the memory 20. In FIG. 1 the user has already typed the "AS" key 28. Since the data tables in the memory 20 are organized according to two-letter prefixes, the contents of the output 64 upon the first keystroke are obtained from the N-gram objects 112 within the memory. The first keystroke "AS" corresponds with a first N-gram object 112 "S" and an associated frequency object 104, as well as another N-gram object 112 "A" and an associated frequency object 104. While the frequency object 104 associated with "S" has a frequency value greater than that of the frequency object 104 associated with "A", it is noted that "A" is itself a complete word. A complete word is always provided as the default output 76 in favor of other prefix objects that do not match complete words, regardless of associated frequency value. As such, in FIG. 1, the default portion 76 of the output 64 is "A".

Figure 7:
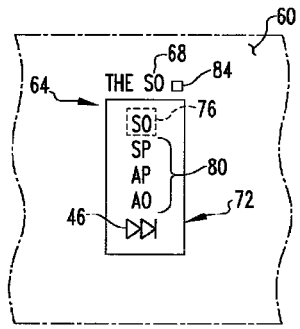
FIG. 7 is an exemplary output during a text entry operation.
Figure 8:
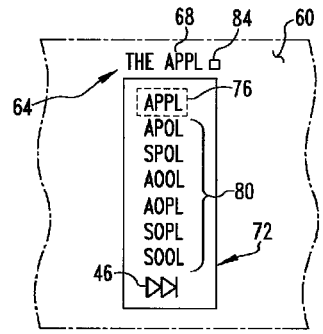
FIG. 8 is another exemplary output during another part of the text entry operation.

In FIG. 7, the user has additionally entered the "OP" key 28. The variants are depicted in FIG. 7. Since the prefix object "SO" is also a word, it is provided as the default output 76. In FIG. 8, the user has again entered the "OP" key 28 and has also entered the "L" key 28. It is noted that the exemplary "L" key 28 depicted herein includes only the single character 48 "L".

It is assumed in the instant example that no operational inputs have thus far been detected. The default output 76 is "APPL", such as would correspond with the word "APPLE". The prefix "APPL" is depicted both in the text component 68, as well as in the default portion 76 of the variant component 72. Variant prefix objects in the variant portion 80 include "APOL", such as would correspond with the word "APOLOGIZE", and the prefix "SPOL", such as would correspond with the word "SPOLIATION".

It is particularly noted that the additional variants "AOOL", "AOPL", "SOPL", and "SOOL" are also depicted as variants 80 in the variant component 72. Since no word object 108 corresponds with these prefix objects, the prefix objects are considered to be orphan prefix objects for which a corresponding word object 108 was not identified. In this regard, it may be desirable for the variant component 72 to include a specific quantity of entries, and in the case of the instant exemplary embodiment the quantity is seven entries. Upon obtaining the result at 224, if the quantity of prefix objects in the result is fewer than the predetermined quantity, the disambiguation function will seek to provide additional outputs until the predetermined number of outputs are provided. In the absence of artificial variants having been created, the additional variant entries are provided by orphan prefix objects. It is noted, however, that if artificial variants had been generated, they likely would have occupied a place of preference in favor of such orphan prefix objects, and possibly also in favor of the prefix objects of the result.

It is further noted that such orphan prefix objects may actually be offspring orphan prefix objects from suspended parent orphan prefix objects and/or artificial variants. Such offspring orphan prefix objects can be again output depending upon frequency ranking as explained below, or as otherwise ranked.

The orphan prefix objects are ranked in order of descending frequency with the use of the N-gram objects 112 and the associated frequency objects 104. Since the orphan prefix objects do not have a corresponding word object 108 with an associated frequency object 104, the frequency objects 104 associated with the various N-gram objects 112 must be employed as a fallback.

Using the N-gram objects 112, the disambiguation function first seeks to determine if any N-gram object 112 having, for instance, three characters is a match for, for instance, a final three characters of any orphan prefix object. The example of three characters is given since the exemplary embodiment of the handheld electronic device 4 includes N-gram objects 112 that are an exemplary maximum of the three characters in length, but it is understood that if the memory 20 included N-gram objects four characters in length or longer, the disambiguation function typically would first seek to determine whether an N-gram object having the greatest length in the memory 20 matches the same quantity of characters at the end of an orphan prefix object.

If only one prefix object corresponds in such a fashion to a three character N-gram object 112, such orphan prefix object is listed first among the various orphan prefix objects in the variant output 80. If additional orphan prefix objects are matched to N-gram objects 112 having three characters, then the frequency objects 104 associated with such identified N-gram objects 112 are analyzed, and the matched orphan prefix objects are ranked amongst themselves in order of decreasing frequency.

If it is determined that a match cannot be obtained with an N-gram object 112 having three characters, then two-character N-gram objects 112 are employed. Since the memory 20 includes all permutations of two-character N-gram objects 112, a last two characters of each orphan prefix object can be matched to a corresponding two-character N-gram object 112. After such matches are achieved, the frequency objects 104 associated with such identified N-gram objects 112 are analyzed, and the orphan prefix objects are ranked amongst themselves in descending order of frequency value of the frequency objects 104 that were associated with the identified N-gram objects 112. It is further noted that artificial variants can similarly be rank ordered amongst themselves using the N-gram objects 112 and the associated frequency objects 104.

Figure 9:
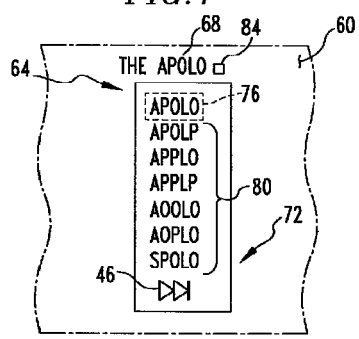
FIG. 9 is another exemplary output during another part of the text entry operation.

In FIG. 9 the user has additionally entered the "OP" key 28. In this circumstance, and as can be seen in FIG. 9, the default portion 76 of the output 64 has become the prefix object "APOLO" such as would correspond with the word "APOLOGIZE", whereas immediately prior to the current input the default portion 76 of the output 64 of FIG. 8 was "APPL" such as would correspond with the word "APPLE." Again, assuming that no operational inputs had been detected, the default prefix object in FIG. 9 does not correspond with the previous default prefix object of FIG. 8. As such, the first artificial variant "APOLP" is generated and in the current example is given a preferred position. The aforementioned artificial variant "APOLP" is generated by deleting the final character of the default prefix object "APOLO" and by supplying in its place an opposite character 48 of the key 28 which generated the final character of the default portion 76 of the output 64, which in the current example of FIG. 9 is "P", so that the aforementioned artificial variant is "APOLP".

Furthermore, since the previous default output "APPL" corresponded with a word object 108, such as the word object 108 corresponding with the word "APPLE", and since with the addition of the current input the previous default output "APPL" no longer corresponds with a word object 108, two additional artificial variants are generated. One artificial variant is "APPLP" and the other artificial variant is "APPLO", and these correspond with the previous default output "APPL" plus the characters 48 of the key 28 that was actuated to generate the current input. These artificial variants are similarly output as part of the variant portion 80 of the output 64.

As can be seen in FIG. 9, the default portion 76 of the output 64 "APOLO" no longer seems to match what would be needed as a prefix for "APPLOADER", and the user likely anticipates that the desired word "APPLOADER" is not already stored in the memory 20. As such, the user provides a selection input, such as by scrolling with the thumbwheel 32, or by actuating the <NEXT> key 40, until the variant string "APPLO" is highlighted. The user then continues typing and enters the "AS" key.

Figure 10:
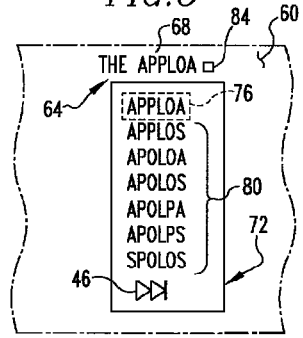
FIG. 10 is another exemplary output during another part of the text entry operation.

The output 64 of such action is depicted in FIG. 10. Here, the string "APPLOA" is the default portion 76 of the output 64. Since the variant string "APPLO" became the default portion 76 of the output 64 (not expressly depicted herein) as a result of the selection input as to the variant string "APPLO", and since the variant string "APP LO" does not correspond with a word object 108, the character strings "APPLOA" and "APPLOS" were created as an artificial variant. Additionally, since the previous default of FIG. 9, "APOLO" previously had corresponded with a word object 108, but now is no longer in correspondence with the default portion 76 of the output 64 of FIG. 10, the additional artificial variants of "APOLOA" and "APOLOS" were also generated. Such artificial variants are given a preferred position in favor of the three displayed orphan prefix objects.

Since the current input sequence in the example no longer corresponds with any word object 108, the portions of the method related to attempting to find corresponding word objects 108 are not executed with further inputs for the current session. That is, since no word object 108 corresponds with the current input sequence, further inputs will likewise not correspond with any word object 108. Avoiding the search of the memory 20 for such nonexistent word objects 108 saves time and avoids wasted processing effort.

As the user continues to type, the user ultimately will successfully enter the word "APPLOADER" and will enter a delimiter input. Upon detection of the delimiter input after the entry of "APPLOADER", the learning function is initiated. Since the word "APPLOADER" does not correspond with a word object 108 in the memory 20, a new word object 108 corresponding with "APPLOADER" is generated and is stored in the new words database 92, along with a corresponding new frequency object 104 which is given an absolute frequency in the upper, say, one-third or one-fourth of the possible frequency range. In this regard, it is noted that the new words database 92 and the frequency learning database 96 are generally organized in two-character prefix data tables similar to those found in the generic word list 88. As such, the new frequency object 104 is initially assigned an absolute frequency value, but upon storage the absolute frequency value, if it is not the maximum value within that data table, will be changed to include a normalized frequency value percentage normalized to whatever is the maximum frequency value within that data table.

Figure 11:
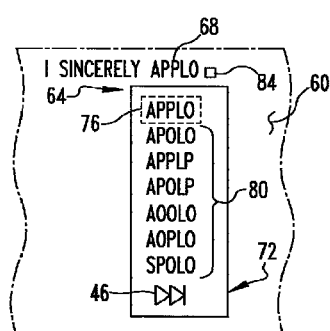
FIG. 11 is an exemplary output on the handheld electronic device during another text entry operation.

As a subsequent example, in FIG. 11 the user is trying to enter the word "APOLOGIZE". The user has entered the key sequence "AS" "OP" "OP" "L" "OP". Since "APPLOADER" has now been added as a word object 108 to the new words database 92 and has been associated with frequency object 104 having a relatively high frequency value, the prefix object "APPLO" which corresponds with "APPLOADER" has been displayed as the default portion 76 of the output 64 in favor of the variant prefix object "APOLO", which corresponds with the desired word "APOLOGIZE." Since the word "APOLOGIZE" corresponds with a word object 108 that is stored at least in the generic word list 88, the user can simply continue to enter keystrokes corresponding with the additional letters "GIZE", which would be the letters in the word "APOLOGIZE" following the prefix object "APOLO", in order to obtain the word "APOLOGIZE". Alternatively, the user may, upon seeing the output 64 depicted in FIG. 11, enter a selection input to affirmatively select the variant prefix object "APOLO". In such a circumstance, the learning function will be triggered upon detection of a delimiter symbol, and the word object 108 that had corresponded with the character string "APOLO" at the time the selection input was made will be stored in the frequency learning database 96 and will be associated with a revised frequency object 104 having a relatively higher frequency value that is similarly stored in the frequency learning database 96.

Figure 12:
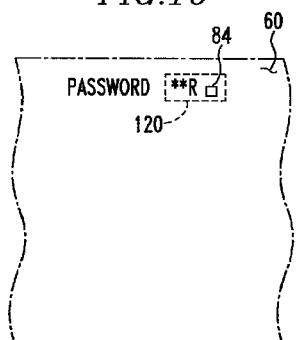
FIG. 12 is an exemplary output that can be provided in an instance when the disambiguation function of the handheld electronic device has been disabled.

An additional feature of the handheld electronic device 4 is depicted generally in FIG. 12. In some circumstances, it is desirable that the disambiguation function be disabled. For instance, when it is desired to enter a password, disambiguation typically is relatively more cumbersome than during ordinary text entry. As such, when the system focus is on the component corresponding with the password field, the component indicates to the API that special processing is requested, and the API disables the disambiguation function and instead enables, for instance, a multi-tap input interpretation system. Alternatively, other input interpretation systems could include a chording system or a press-and-hold/press-and-release interpretation system. As such, while an input entered with the disambiguation function active is an ambiguous input, by enabling the alternative interpretation system, such as the exemplary multi-tap system, each input can be largely unambiguous.

As can be understood from FIG. 12, each unambiguous input is displayed for a very short period of time within the password field 120, and is then replaced with another output, such as the asterisk. The character "R" is shown displayed, it being understood that such display is only for a very short period of time.

As can be seen in FIGS. 1 and 7-11, the output 64 includes the displayed graphic 46 near the lower end of the variant component 72, and that the displayed graphic 46 is highly similar to the graphic 42 of the <NEXT> key 40. Such a depiction provides an indication to the user which of the keys 28 of the keypad 24 can be actuated to select a variant output. The depiction of the displayed graphic 46 provides an association between the output 64 and the <NEXT> key 40 in the user's mind. Additionally, if the user employs the <NEXT> key 40 to provide a selection input, the user will be able to actuate the <NEXT> key 40 without moving the user's hands away from the position the hands were in with respect to the housing 6 during text entry, which reduces unnecessary hand motions, such as would be required if a user needed to move a hand to actuate the thumbwheel 32. This saves time and effort.

It is also noted that the system can detect the existence of certain predefined symbols as being delimiter signals if no word object 108 corresponds with the text entry that includes the symbol. For instance, if the user desired to enter the input "one-off", the user might begin by entering the key sequence "OP" "BN" "ER" "ZX" "OP", with the "ZX" actuation being intended to refer to the hyphen symbol disposed thereon. Alternatively, instead of typing the "ZX" key the user might actuate an <ALT> entry to unambiguously indicate the hyphen.

Assuming that the memory 20 does not already include a word object 108 of "one-off", the disambiguation function will detect the hyphen as being a delimiter input. As such, the key entries preceding the delimiter input will be delimited from the key entries subsequent to the delimiter input. As such, the desired input will be searched as two separate words, i.e., "ONE" and "OFF", with the hyphen therebetween. This facilitates processing by more narrowly identifying what is desired to be searched.

The handheld electronic device 4 can also be configured to identify and provide proposed compound language solutions to an ambiguous input. For instance, a user may seek to input the word "highschool", which can be said to be a compound language expression that comprises the words "high" and "school". If it is assumed that the word "highschool" is not already stored as a language object 100 in the memory 20, the handheld electronic device 4 can encounter difficulty when attempting to disambiguate such an ambiguous input. Advantageously, therefore, the handheld electronic device 4 is configured to seek compound language solutions in certain circumstances.

As a general matter, the handheld electronic device 4 will seek to identify and output at a position of relatively higher priority, i.e., at the top of a list, one or more proposed outputs that are representative of at least a portion of a language object 100 that corresponds with an ambiguous input in its entirety. That is, single word solutions are considered to be preferred over compound language solutions. However, compound language solutions can be identified and output as being solutions that are relatively less preferred than single word solutions but that are more preferred than solutions that include artificial variants. By way of example, therefore, the handheld electronic device 4 can, in response to an ambiguous input, provide an output that comprises a plurality of solutions, with a number of the solutions corresponding with single word solutions and being output at a position of highest priority, with a number of compound language solutions output at a position of relatively moderate priority, and with a number of solutions based upon artificial variants that are output at a position of relatively low priority. The quantity of results can be tailored based upon user preference, and thus may include fewer than all of the results mentioned above.

It is noted that a compound language solution typically is representative of two or more language objects 100, meaning that compound language solutions can be representative of a pair of language objects 100 and/or can be representative of three or more language objects 100. For the sake of simplicity in illustrating some of the aspects of the disclosed and claimed concept, a first set of examples presented below are described in terms of compound language solutions that are representative of two language objects 100. As will be set forth in greater detail below, however, the same aspects exist in and can be obtained from compound language solutions that are representative of three or more language objects 100.

Figure 13:
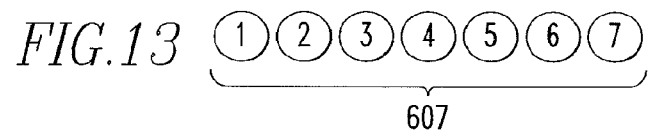
FIG. 13 is a schematic depiction of an ambiguous input to the handheld electronic device of FIG. 1.
Figure 13A:
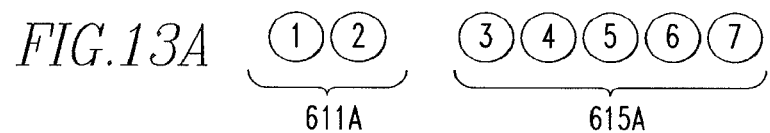
FIG. 13A is a schematic depiction of the ambiguous input of FIG. 13 in accordance with a compound language solution.
Figure 13B:
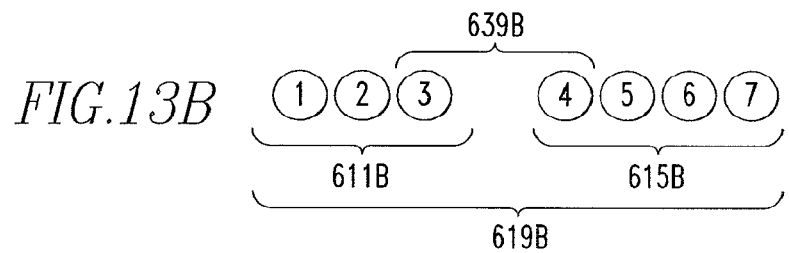
FIG. 13B is a schematic depiction of the ambiguous input of FIG. 13 in accordance with another compound language solution.
Figure 13C:
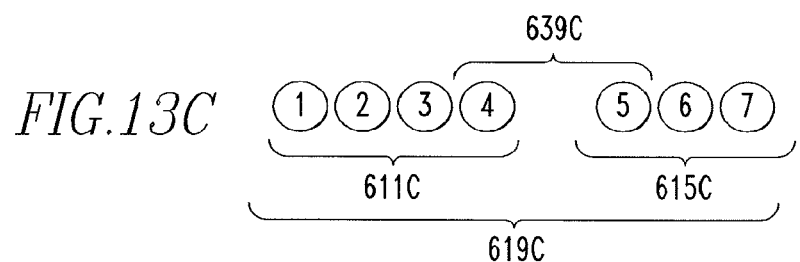
FIG. 13C is a schematic depiction of the ambiguous input of FIG. 13 in accordance with another compound language solution.
Figure 13D:
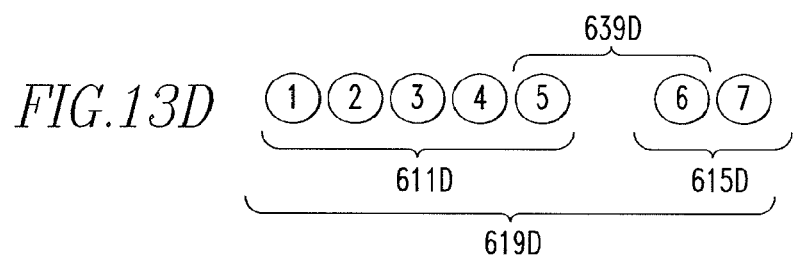
FIG. 13D is a schematic depiction of the ambiguous input of FIG. 13 in accordance with another compound language solution.

As is depicted generally in FIGS. 13-13D, an exemplary ambiguous input 607 (FIG. 13) is shown as including seven input member actuations represented by the encircled digits 1 through 7. The disambiguation routine 22 will first seek to identify one or more language objects 100 that correspond with the ambiguous input in its entirety. That is, the disambiguation routine 22 will seek to identify language objects 100 having seven or more linguistic elements and that correspond with the entire ambiguous input 607. Depending upon the ambiguous input 607, it is possible that no such corresponding language object 100 can be identified in the memory 20.

Depending upon the ambiguous input 607, the disambiguation routine 22 may additionally seek to interpret the ambiguous input 607 as a compound language input. In the depicted exemplary embodiment, the disambiguation routine 22 seeks compound language solutions whenever a language object 100 is identified that corresponds with a first portion of the ambiguous input 607 and that has a length that is equal to the length as the first portion. As employed herein, the expression "length" and variations thereof shall refer broadly to a quantity of elements of which an object is comprised, such as the quantity of linguistic elements of which a language object 100 is comprised.

The disambiguation routine 22 seeks compound language solutions in response to an ambiguous input if an initial portion of the ambiguous input is determined to be the same as a language object 100 in the memory 20. In the example presented herein, such an "initial portion" begins with the first input member actuation of the ambiguous input 607 and ends prior to the final input member actuation, although variations are possible.

For instance, if it is assumed that a user in inputting the ambiguous input 607 is seeking to input the word "highschool", the disambiguation routine 22 would already have recognized at various points during entry of the ambiguous input 607 that various initial portions of the ambiguous input 607 corresponded with various language objects 100 and had a length equal thereto. As is depicted generally in FIG. 13A, during entry of the ambiguous input 607, the disambiguation routine 22 would have recognized that the first two input member actuations, namely <GH> and <UI>, i.e., a first portion 611A, were an initial portion that corresponded with and were of an equal length to the length of the language object 100 for "hi". Such recognition would have occurred with the second input member actuation.

With the first portion 611A having been identified as representing a complete word as represented by a language object 100, the disambiguation routine 22 would thus seek to identify another language object 100 that corresponded with another portion of the ambiguous input 607 successive to the first portion 611A. It is reiterated that some of the examples presented herein are described in terms of two-component compound language solutions for the sake of simplicity, and in the present example, therefore, the disambiguation routine 22 would seek to identify a language object 100 that corresponded with a second portion 615A of the ambiguous input 607. Such second portion 615A would comprise actuations of the keys 28 <GH> <GH> <AS> <CV> and <GH> following the first portion 611A. If it is assumed that no language object 100 can be found in the memory 20 that corresponds with such second portion 615A, the two-component compound language solution sought in the fashion depicted generally in FIG. 13A would fail. It is stated for purposes of completeness that one or more compound language solutions representative of three or more language objects 100 potentially could be found for the ambiguous input 607 but are not illustrated herein.

The disambiguation routine 22 would additionally have noted that the first three input member actuations, i.e., <GH> <UI> <GH>, are another first portion 611B of the ambiguous input 607 that corresponds with and has a length equal to that of a language object 100 in the memory 20, specifically, the language object 100 for the word "hug", as is depicted generally in FIG. 13B. The disambiguation routine 22 thus will seek to identify a language object 100 in the memory 20 that corresponds with a second portion 615B of the ambiguous input 607, i.e., <GH> <AS> <CV> <GH>. If it is assumed that a language object 100 in the memory 20 exists for the English word "hachure", the disambiguation routine will interpret the ambiguous input 607 as potentially being an attempted input of the compound language expression "hughachure". That is, a potential compound language solution for the ambiguous input 607 would be representative of the language object 100 for "hug" and the language object 100 for "hachure".

As will be described in greater detail below, and as is depicted in FIG. 14, the handheld electronic device 4 can output "hughhach" as a representation 619B of the compound language solution "hughachure", with such representation 619B comprising a representation of the language object 100 for "hug" and a representation of a portion of the language object 100 for "hachure". This representation 619B is also depicted schematically in FIG. 13B.

Similarly, and as depicted generally in FIG. 13C, the disambiguation routine 22 will have recognized that the first four input member actuations of the ambiguous input 607 likewise are a first portion 611C of the ambiguous input 607 that corresponds with and has a length equal to that of a language object 100 in the memory 20, specifically, for the word "high". The disambiguation routine 22 will thus seek to identify a language object 100 in the memory 20 that corresponds with a second portion 615C of the ambiguous input 607 that follows the first portion 611C. Specifically, the disambiguation routine 22 will determine that the second portion 615C, i.e., <AS> <CV> <GH>, corresponds with the language object 100 for the word "school". The disambiguation routine 22 thus may additionally determine that the ambiguous input 607 may be an attempt by the user to input the compound expression "highschool", thus generating the compound language solution "high" plus "school". The device could output "highsch" as a representation 619C of such compound language solution. The representation 619C is depicted schematically in FIG. 13C.

Furthermore, and as depicted generally in FIG. 13D, the disambiguation routine 22 may determine that the first five input member actuations constitute another first portion 611D that corresponds with and has a length equal to that of the language object 100 for the word "highs". The disambiguation routine will thus also seek to identify a second language object 100 that corresponds with a second portion 615D of the ambiguous input 607 that follows the first portion 611D. For instance, the disambiguation routine might identify the language object 100 for the word "choice" as corresponding with the second portion 615D. The disambiguation routine 22 thus would interpret the ambiguous input 607 as potentially being an attempt by the user to enter the compound language expression "highschoice" by generating the compound language solution "highs" plus "choice". The handheld electronic device 4 could output "highsch" as a representation 619D of the compound language solution "highs" plus "choice", it being noted that this representation 619D is the same as the representation 619B, with the representations 619B and 619D thus being output as a single variant to avoid undesirable duplication.

In order to limit the generation of compound language solutions having a very low likelihood or no likelihood of being what a user intended to enter, the disambiguation routine 22 additionally performs an analysis of the combination of the language objects 100 making up a compound language solution. Specifically, and as is depicted generally in FIGS. 13B, 13C, and 13D, at least one junction object 639B, 639C, and 639D is generated for each compound language solution. In the example depicted in FIGS. 13B, 13C, and 13D, the junction object of a compound solution is the terminal linguistic element of the one language object followed by the initial linguistic element of the adjacent language object. Thus, the junction object 639B of the compound language solution "hug" plus "hachure" is the linguistic element string "gh". Similarly, the junction object 639C of the compound language solution "high" plus "school" is the linguistic element string "hs". Still similarly, the junction object 639D of the compound language solution "highs" plus "choice" is the linguistic element string "sc".

Each junction object 639B, 639C, and 639D, etc., is sought to be compared with one or more N-gram objects 112 in the memory 20. This provides the disambiguation routine 22 an opportunity to take appropriate action if the junction object 639B, 639C, and 639D, etc., is of a very low frequency or is nonexistent in the present language. In the present example, the junction objects 639B, 639C, and 639D are each two linguistic elements in length and thus would each be compared with a number of the 2-gram objects.

If a particular junction object corresponds with an N-gram object 112 that is associated with a frequency object 104 having a relatively low frequency value, such as a frequency value below a predetermined threshold, this would indicate that the particular compound language solution from which the particular junction object was derived is extremely unlikely to be the entry desired by the user. That is, since the frequency value of a frequency object 104 associated with an N-gram objects 112 indicates the relative probability that the character string represented by that particular N-gram object 112 exists at any location within any word of the relevant language, the correspondence of a low-probability N-gram 112 with a junction object indicates of a low-probability compound language solution.

Similarly, if no N-gram object 112 can be found that corresponds with a particular junction object, this would also indicate a low probability or a zero probability compound language solution. In the present exemplary embodiment, the memory 20 has stored therein all of the two-character permutations of the twenty-six Latin letters. As such, in the present exemplary configuration a 2-gram object will generally always be identified as corresponding with a junction object have a length of two linguistic elements. As will be explained below, however, a junction object can be more than two linguistic elements in length, and the exemplary embodiment of the handheld electronic device 4 has fewer than all of the three-character permutation of the twenty-six Latin letters. In some circumstances, therefore, it is possible that an N-gram object 112 cannot be found that corresponds with a particular junction object. It is also noted that in other embodiments the handheld electronic device may have fewer than all of the two-character permutations of the twenty-six Latin letters stored therein, and a lack of N-gram correspondence with a junction object could occur in this situation as well.

In the present exemplary embodiment, the disambiguation routine 22 assigns to a given compound language solution the frequency value of the N-gram object 112 identified as corresponding with the junction object of the compound language solution. If no corresponding N-gram object 112 was identified, a frequency value of zero is assigned. The disambiguation routine 22 can arrange the compound language solutions in decreasing order of frequency value. If the frequency value of a compound language solution is zero or is below a predetermined threshold, the disambiguation routine can, for example, suppress the compound language solution from the output or can output it at a position of relatively low probability.

In the present example, the linguistic element string "gh", "hs", and "sc" of the junction objects 639B, 639C, and 639D are unlikely to be of an undesirably low probability, and the corresponding compound language solutions are thus unlikely to be suppressed from the output. On the other hand, a junction object in the form of the linguistic string "qg" likely would result in the corresponding compound language solution being suppressed or at least output at a position of relatively low priority.

In order to limit the generation of compound language solutions having a very low likelihood of being what a user intended to enter, the disambiguation routine 22 additionally limits the data sources from which second and subsequent language objects 100 of a compound language solution can be identified. For instance, the generic word list 88 is a data source that is substantially inviolate and has stored therein various language objects 100. The generic word list 88 can be the source of any of the linguistic objects 100 of which a compound language solution is comprised. On the other hand, the new words database 92, for example, has stored therein language objects 100 representative of custom words, and the contents of the new words database 92 can change. While the new words database 92 can be the source of a first language object 100 of a compound language solution, the new words database 92 will not, in the present exemplary embodiment, be a source of a second or subsequent language object 100 of a compound language solution.

It is further noted that an alphabet on the handheld electronic device 4 comprises all of the linguistic elements that are available on the handheld electronic device 4. The alphabet comprises a core alphabet and an extended alphabet. In the present exemplary embodiment, the core alphabet is comprised of the twenty-six Latin letters. The language objects in the generic word list are comprised only of the linguistic elements of the core alphabet. The extended alphabet comprises linguistic elements other than the twenty-six Latin letters. The linguistic element in the extended alphabet thus might include characters in non-Latin languages, and may additionally or alternatively include Latin letters with diacritics such as the Latin letter "U" with an umlaut, thus "Ü". In this regard, the new words database 92 might include a language object 100 representative of the word "MÜNCHEN" and another language object 100 representative of the word "ÜBER".

In disambiguating an ambiguous input, the disambiguation routine looks, at least initially, in all of the data sources on the handheld electronic device 4 to identify language objects 100 that correspond with the ambiguous input. If it is determined, however, that no single language object 100 corresponds with the entire ambiguous input, but that an initial portion of the ambiguous input corresponded with and was of an equal length to a language object 100, the disambiguation routine 22 looks only in the generic word list 88, i.e., a static data source, for language objects 100 that might correspond with portions of the ambiguous input succeeding the initial portion thereof. As such, it would be possible, depending upon the ambiguous input, for the handheld electronic device 4 to identify "ÜBERGENIUS" as a compound language solution. That is, the language object 100 for "ÜBER" could have been identified in the new words database 92, and the language object 100 for "GENIUS" could have been identified in the generic word list 88. It would not, however, be possible for it to identify "GOLDMÜNCHEN" as a compound language solution when a user has actuated the keys <GH> <OP> <L> <DF> <M> <UI> during an intended entry of the word "GOLDMINE". That is, while the language object 100 for "GOLD" could have been identified in the generic word list 88, the language object 100 for "MÜNCHEN" would not have been identified as a second or subsequent word of such a compound language solution since only the generic word list 88 is examined in seeking such second or subsequent words, and the language object 100 for "MÜNCHEN" in the present example is stored in the new words database 92.

As a general matter, in response to an ambiguous input, any generated compound language solutions are output at a position of relatively lower priority than any language object 100 that corresponds with the entire ambiguous input. The compound language solutions are themselves arranged and output in decreasing order of priority according to the increasing quantity of language objects 100 therein. That is, a compound language solution comprised of two language objects 100 will be output at a position of relatively higher priority than a compound language solution comprised of three language objects 100, and so forth.

If a plurality of compound language solutions each are comprised of the same quantity of language objects 100, such as in the example depicted in FIGS. 13-13D wherein the compound language solutions are each comprised of two language objects 100, a length identity value is calculated for each such compound language solution. The length identity calculation depends upon whether the compound language solution is comprised of two language objects 100 or is comprised of three or more language objects 100.

If a compound language solution is comprised of two language objects 100, the ambiguous input can thus be said to include a first portion and a second portion. The difference in length between the first portion and the second portion is determined to be the length identity for the compound language solution. By way of example, the compound language solution of FIG. 13B is of a length identity having a value of 1, the compound language solution in FIG. 13C would also be of a length identity having a value of 1, and the compound language solution in FIG. 13D would be of a length identity having a value of 3.

If the compound language solution is comprised of three or more language objects 100, the ambiguous input can be said to comprise three or more portions. In such a situation, the length identity of the compound language solution is the sum of each length difference between a given portion of the ambiguous input having a given length and the portion of the ambiguous input having the next greatest length shorter than the given length. For instance, the ambiguous input 607 of FIG. 13 may have resulted in the generation of three compound language solutions each being comprised of three language objects, as set forth in FIGS. 13E, 13F, and 13G.

In FIG. 13E, a first portion 611E of the ambiguous input 607 is three linguistic elements in length, a second portion 615E is two linguistic elements in length, and a third portion 657E is two linguistic elements in length. The difference in length between the longest portion, i.e., the first portion 611E three linguistic elements in length, and the portion having the next greatest length, i.e., either of the second and third portions 615E and 657E each two linguistic elements in length, is 1. There is zero difference in length between the second and third portions 615E and 657E. Thus, 1 plus zero equals 1, and the calculated value of the length identity for the compound language solution, a representation of a portion of which is depicted schematically at the numeral 619E, is 1.

It is noted that FIG. 13E depicts a first junction object 639E and a second junction object 659E generated for the compound language solution thereof. If either of the junction objects 639E and 659E corresponds with an N-gram 112 associated with a frequency object 104 having a frequency value below a predetermined threshold, or if no corresponding N-gram 112 can be found for either of the junction objects 639E and 659E, the compound language solution likely will be suppressed and not be output.

In FIG. 13F, a first portion 611F of the ambiguous input 607 is three linguistic elements in length, a second portion 615F is three linguistic elements in length, and a third portion 657F is one linguistic element in length. There is zero difference in length between the first and second portions 611F and 615F, which are each the longest portions. The difference in length between either of the longest portions, i.e., the first and second portions 611F and 615F which are each three linguistic elements in length, and the portion having the next greatest length, i.e., the third portion 657F one linguistic element in length, is 2. Thus, zero plus 2 equals 2, and the calculated value of the length identity for the compound language solution, a representation of a portion of which is depicted schematically at the numeral 619F, is 2.

In FIG. 13G, a first portion 611G of the ambiguous input 607 is two linguistic elements in length, a second portion 615G is four linguistic elements in length, and a third portion 657G is one linguistic element in length. The difference in length between the longest portion, i.e., the second portion 615F four linguistic elements in length, and the portion having the next greatest length shorter than this length, i.e., the first portion 611G having a length of two linguistic elements, is 2. The difference in length between the first portion 611F two linguistic elements in length, and the portion having the next greatest length shorter than this length, i.e., the third portion 657F one linguistic element in length, is 1. Thus, 2 plus 1 equals 3, and the calculated value of the length identity for the compound language solution, a representation of a portion of which is depicted schematically at the numeral 619G, is 3.

The plurality of compound language solutions that each are comprised of the same quantity of language objects 100 are then output with respect to one another in decreasing order of priority according to the increasing calculated value of length identity. It is noted that the compound language solutions can be said to have a progressively lesser "degree" of "length identity" as the calculated length identity increases in value.

If a plurality of the compound language solutions that are comprised of the same quantity of language objects 100 additionally have the same calculated length identity value, these compound language solutions are assigned a compound frequency value. The compound frequency value of a compound language solution is, in the present example, an average of the frequency values of the frequency objects 104 associated with the language objects 100 of the compound language solution. Alternatively, the compound frequency value could be defined as the frequency value of the final language object 100 of the compound language solution, or still alternatively could be defined in other appropriate fashions. Regardless of the specific fashion in which a compound frequency value is determined, such compound language solutions are output with respect to one another in decreasing order of priority according to the decreasing compound frequency value.

In this regard, it is noted that this composite frequency value is different than the frequency value associated with the compound language solution as a result of comparing a junction object thereof with the N-gram objects 112. A compound language solution comprised of three or more language objects 100 will have a plurality of junction objects generated therefor, for example. If any of the junction objects of any compound language solution indicates a probability of zero or a probability below a predetermined threshold, in the present exemplary embodiment such compound language solution will be unlikely to be output at all, and thus will not be considered when arranging representations of compound language solutions in priority order for output.

In the example of FIGS. 13-13D, the disambiguation routine 22 has determined that no language object 100 corresponds with the entire ambiguous input 607, but has determined that the ambiguous input 607 could represent an attempt by the user to input any of three possible compound language expressions, with each compound language expression being comprised of two language objects 100. It is noted that the example of FIGS. 13E-13G shall be considered no further. The disambiguation routine 22 thus will output at least some of the possible compound language solutions, as is indicated generally in FIG. 14.

The various compound language solutions of FIGS. 13B-13D, each being comprised of two language objects 100, are output in order according to the algorithm described above. Any solutions resulting from a single language object 100 corresponding with the entire ambiguous input 607 would be output at a position of relatively highest priority in order of decreasing frequency value. In the present example, no such single language objects 100 were found to correspond with the ambiguous input 607.

Representations of the various compound language solutions of FIGS. 13B-13D, each being comprised of two language objects 100, are output according to a decreasing degree of length identity. That is, as mentioned above, the compound language solutions are output in order of increasing calculated value of length identity. In the present example, representations of the compound language solutions of FIGS. 13B and 13C would each be output at a position of relatively higher priority than the compound language solution of FIG. 13D.

It is noted, however, that the compound language solutions of FIGS. 13B and 13C both have a length identity with a value of 1. The compound language solutions having the same length identity value will thus be output amongst themselves according to decreasing composite frequency value.

For instance, if it is assumed that the frequency value of the language object 100 for "hug" is 25,000, and that the frequency value of the language object 100 for "hachure" is 2000, the two frequency values would be summed and divided by two to obtain a compound frequency value of 13,500 for the compound language solution of FIG. 13B. If it is further assumed that the frequency value of the language object 100 for "high" is 26,000, and that the frequency value of the language object 100 for "school" is 14,000, the two frequency values would be summed and divided by two to obtain a compound frequency value of 20,000. Since 20,000 is greater than 13,500, the compound language solution 619 "HIGHSCH" would be output as being of a relatively higher priority than the compound language solution 623 "HUGHACH". It is noted that the compound language solution for FIG. 13D ordinarily would be output at a position of relatively lower priority than the compound language solution 623 "HUGHACH", however the compound language solution for FIG. 13D would be the same as the compound language solution 619 "HIGHSCH". The compound language solution for FIG. 13D thus would not be output inasmuch as it would constitute a duplicate compound language solution for ambiguous input 607.

Figure 15B:
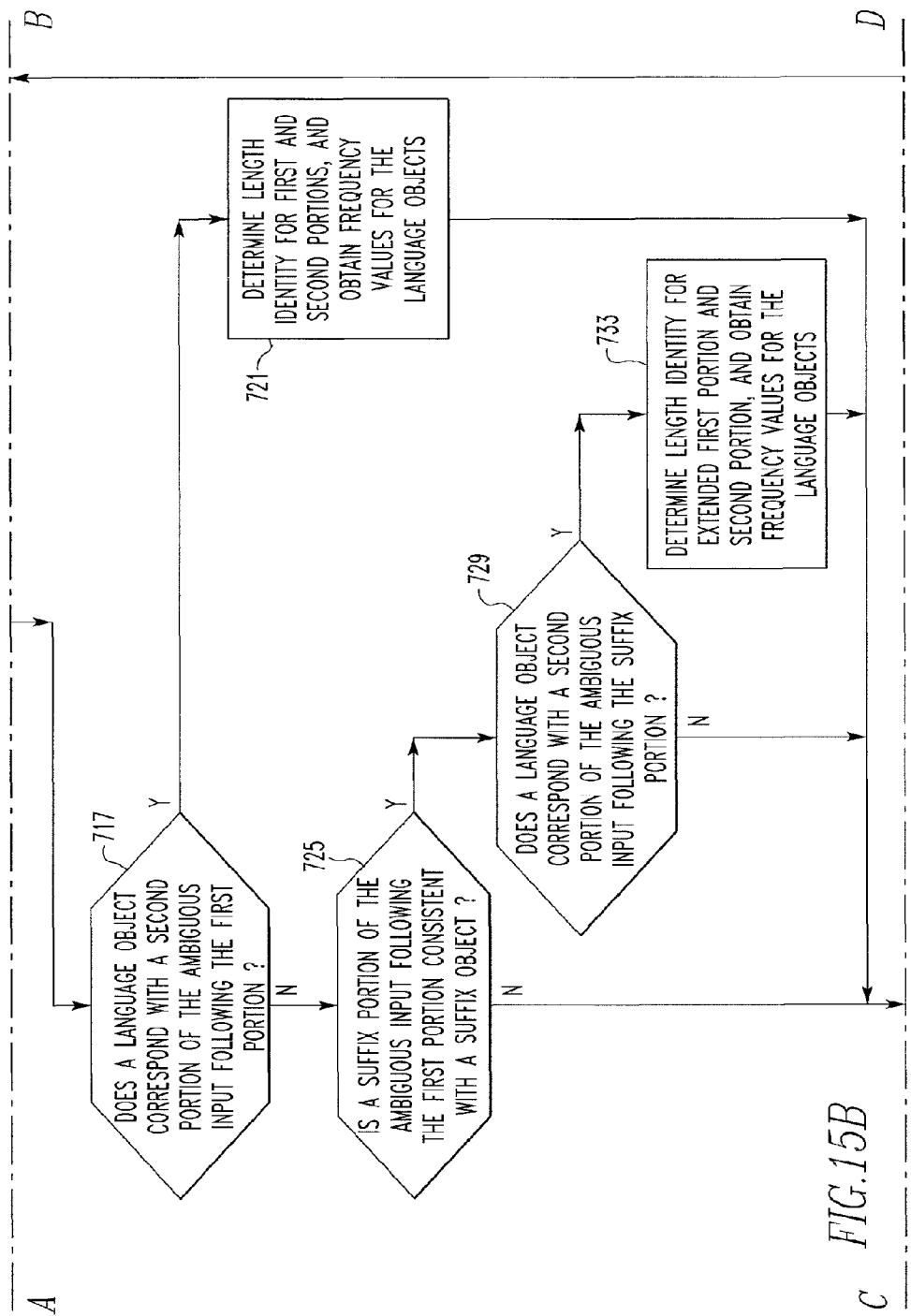
Figure 15C:
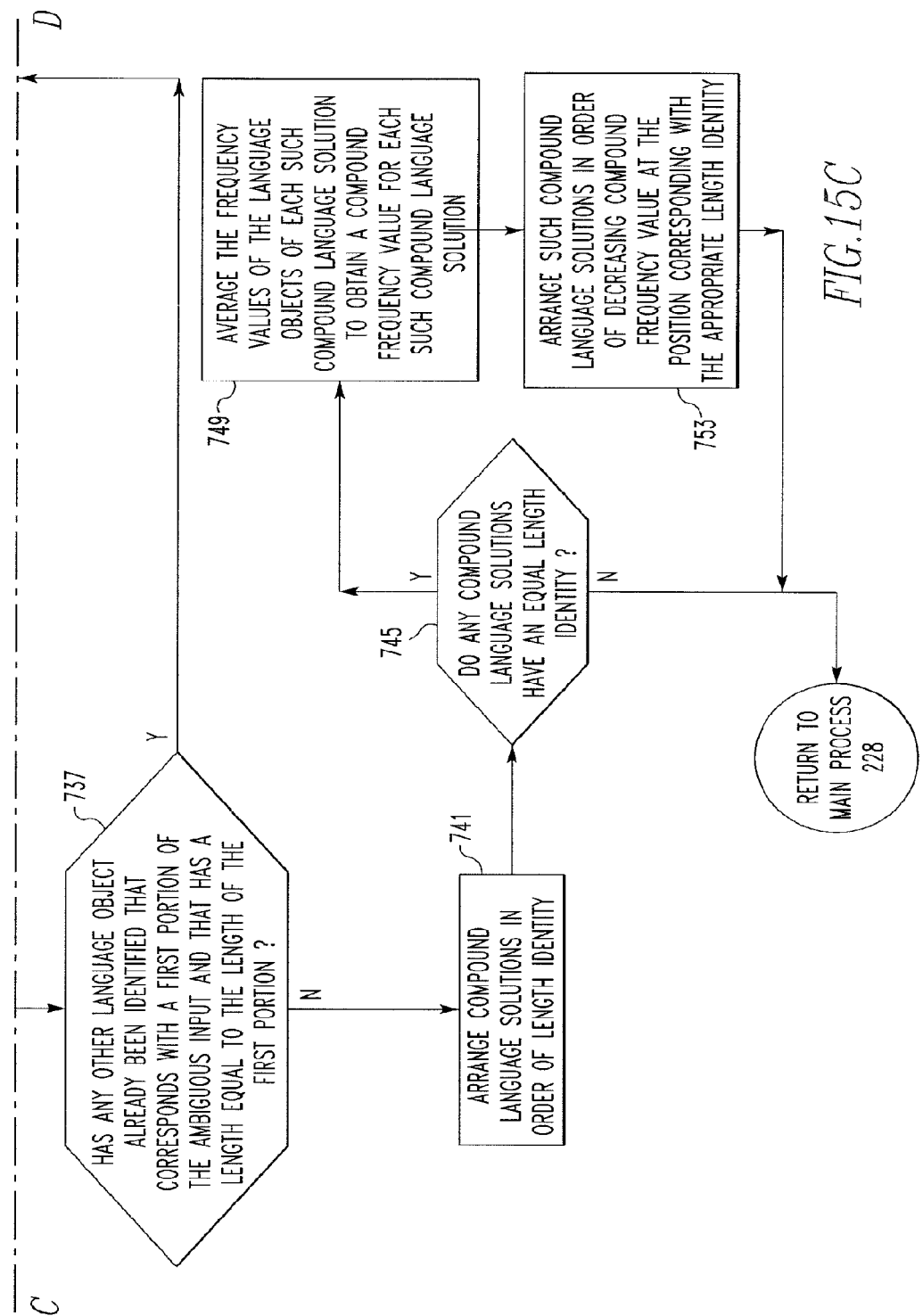

An exemplary flowchart of a method is indicated generally in FIGS. 15A-15C. For purposes of clarity, the flowchart of FIGS. 15A-15C is directed toward the exemplary situation depicted generally in FIGS. 13B-13D wherein the three generated compound language solutions are each comprised of two language objects 100. As such, the typical first step in the general analysis set forth herein wherein compound language solutions comprised of relatively lesser quantities of language objects 100 are placed at positions of relatively higher priority than other compound language solutions comprised of relatively greater quantities of language objects 100 is obviated in the present example.

As mentioned elsewhere herein, it is determined, as at 255 in FIG. 3A, whether any language objects 100 were identified as corresponding with the ambiguous input. If not, processing branches, as at 226, to FIG. 15A for a subsystem.

It is then determined, as at 713, whether or not a language object has already been identified that corresponds with a first portion of the ambiguous input and that has a length equal to the length of such first portion. If not, processing returns to the main process at 228 where the need for artificial variants can be determined.

However, if it is determined at 713 that a language object was previously identified that corresponds with and has a length equal to a first portion of the ambiguous input, processing continues, as at 717, where it is determined whether or not a second language object corresponds with a second portion of the ambiguous input following the first portion. If it is determined at 717 that such a second language object has been identified, processing continues, as at 721, where a length identity is determined for the compound language solution and frequency values for the first and second language objects are obtained.

However, if it is determined at 717 that a second language object cannot be identified as corresponding with the second portion of the ambiguous input that follows the first portion, processing continues, as at 725, where it is determined whether or not a suffix portion of the ambiguous input that follows the first portion of the ambiguous input is consistent with a suffix object stored in the memory 20. In this regard, it is noted that certain languages are considered to be analytic languages, and certain languages are considered to be synthetic languages. In an analytic language, compounds are simply elements strung together without any additional characters or markers. English, for example, is an analytic language.

On the other hand, the German compound kapitänspatent consists of the lexemes kapitän and patent joined by the genitive case marker s. In the German language, therefore, the genitive case marker s potentially could be a suffix object from among a number of predetermined suffix objects stored in the memory 20.

As such, if it is determined at 717 that no second language object corresponds with the second portion of the ambiguous input following the first portion of the ambiguous input, processing continues to 725 where it is determined whether or not a portion of the ambiguous input that follows the first portion of the ambiguous input, i.e., a suffix portion, is consistent with a suffix object in the memory 20.

For instance, if an ambiguous input had been <JK> <AS> <OP> <UI> <TY> <AS> <BN> <AS> <OP> <AS> <TY> <ER> <BN>, the disambiguation routine 22 would have determined at 713 that the first seven input member actuations, i.e., <JK> <AS> <OP> <UI> <TY> <AS> <BN>, had been identified as constituting a first portion of the ambiguous input that corresponds with and has a length equal to the language object 100 for "kapitän". In the present example, it is assumed that the disambiguation routine 22 would have determined at 717 that no language object 100 corresponds with the portion of the ambiguous input that follows such a first portion, i.e., no language object 100 would exist for <AS> <OP> <AS> <TY> <ER> <BN>.

The exemplary disambiguation routine 22 would then determine, as at 725, whether the input member actuation <AS> following the first portion of the ambiguous input, i.e., <JK> <AS> <OP> <UI> <TY> <AS> <BN>, constitutes a suffix portion that is consistent with a suffix object in the memory 20. In the present example, it is assumed that the genitive case marker s is a suffix object stored in the memory 20. The disambiguation routine thus would determine at 725 that the input member actuation <AS> corresponds with the genitive case marker s, meaning that the input member actuation <AS> is consistent with a suffix object in the memory 20.

If yes, processing then continues, as at 729, where it is determined whether or not a language object 100 corresponds with a second portion of the ambiguous input following the identified suffix portion. That is, the disambiguation routine 22 will determine whether or not a language object 100 can be found that corresponds with <OP> <AS> <TY> <ER> <BN>. In the present example, the disambiguation routine 22 would determine that the language object 100 for "patent" corresponds with such a second portion of the ambiguous input that follows the suffix portion of the ambiguous input. If yes, processing continues at 733 where a length identity is determined for the compound language solution, and frequency values are obtained for the frequency objects that are used to obtain the compound language solution.

Specifically, the length identity for a compound language solution that includes a suffix object would be the difference in length between an extended first portion, i.e., the first portion plus the suffix portion, and the second portion. In the present example, the length of kapitäns is eight characters, and the length of paten is five characters. Thus, the length identity for the compound language solution "kapitänspatent" would have a value of 3. The frequency values obtained would be those for the language objects 100 for kapitän and for patent.

It may be determined at 725 that no suffix object in the memory 20 corresponds with a portion of the ambiguous input that follows the first portion. It alternatively may be determined at 729 that no language object 100 corresponds with a second portion of the ambiguous input following a suffix portion of the ambiguous input identified at 725. In either situation, an attempted compound language solution will fail, and processing will proceed to 737.

Once a compound language solution is identified or fails, as described above, processing continues, as at 737, where it is determined whether any other language objects 100 have been identified that correspond with a first portion of the ambiguous input and that have a length equal to the first portion. In this regard, such other language objects 100 may be alternative language objects 100 that were identified for the same first portion, such as where language objects 100 for "hug" and for "gig" would be first language objects 100 each corresponding with and having a length equal to the same first portion 611B of the ambiguous input 607 of FIG. 13B, i.e., the first three input member actuations. Alternatively, the additional language objects 100 might be other language objects 100 that correspond with a different first portion of the ambiguous input, such as in the way the language object 100 for "hi" corresponded with and had a length equal to a two-character first portion 611A of the ambiguous input 607, and the language object 100 for "hug" corresponded with and had a length equal to a three-character first portion 611B of the ambiguous input 607. If at 737 it is determined that another first language object 100 has been identified for which compound language processing has not yet been performed, processing continues to 717 where, for instance, it is determined whether a second language object 100 corresponds with a second portion of the ambiguous input following such first portion of the ambiguous input for which the another first language object 100 had been identified.

If it is determined at 737 that no such other first language objects have been identified, meaning that all possible compound language solutions have been identified, processing continues, as at 741, where the compound language solutions are output in order of decreasing degree of length identity, i.e., in increasing order of the value of the length identity of the various compound language solutions. Pursuant to such output, it is determined, as at 745, whether any compound language solutions have an equal length identity. If so, processing continues, as at 749, where the frequency values of the language objects from which the compound language solutions were derived are averaged to obtain a compound frequency value for each such compound language solution. Such compound language solutions of equal length identity are more specifically output, as at 753, in order of decreasing frequency value at the position that corresponds with the length identity of such compound language solutions. Processing then continues, as at 701, where additional input member actuations of the ambiguous input can be detected.

It is noted that a suffix portion of an ambiguous input is not limited to a single input member actuation, and that a plurality of input member actuations can be analyzed as a suffix portion to determine whether such suffix portion is consistent with a predetermined suffix object in the memory 20. It is further noted that a junction object generated in the context of an identified suffix portion will comprise the suffix portion in addition to the terminal linguistic element of the preceding language object and the initial linguistic element of the succeeding language object. Moreover, it is noted that suffix portions can be identified and employed in the context of compound language solutions comprising three or more language objects 100 and need not be limited to positions immediately succeeding a first language object 100 in a compound language solution; it being noted that suffix portions can be identified and employed successive to second and subsequent language objects 100 of a compound language solution.

It is further noted that the disambiguation routine 22 can be employed to identify compound language solutions when the ambiguous input includes an explicit separating input. For instance, an ambiguous input 807 may include a first portion 827 followed by a separating input 831 followed by a second portion 835. In such a circumstance, the disambiguation routine will seek to identify a language object 100 that corresponds with the second portion 835 of the ambiguous input 807 regardless of whether a language object 100 was identified that corresponds with and has a length equal to the length of the first portion 827. In other words, the user signals to the disambiguation routine that the first portion 827 is to be treated as a first component of a compound language input, and such signal is provided by the user by the inputting of the separating input 831. It is noted that such a separating input 831 can be provided by the user whether a language object 100 was identified that corresponds with and has a length equal to the first portion 827, whether no such language object 100 was identified, and/or whether the output for the first portion 827 was the result of an artificial variant.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. An input method for an electronic device having a display and a memory having stored therein a number of language objects and a number of associated frequency values, at least some of the language objects each comprising a number of characters, the method comprising:
   detecting an ambiguous text input including a set of characters;
   generating a set of language objects, at least one language object in the set of language objects comprising a first language object that corresponds with an initial set of characters of the ambiguous text input and a second language object that corresponds with another set of characters of the ambiguous text input;
   generating a junction object comprising a terminal character of the first language object and an initial character of the second language object;
   determining a frequency value associated with the junction object; and
   outputting a representation of the at least one language object based, at least in part, on the determined frequency value.

2. The method of claim 1, wherein the outputting comprises at least one of:
   outputting the representation of the at least one language object at a position of relatively lower priority than a representation of another language object in the set of language objects, or
   suppressing from the output the at least one language object.

3. The method of claim 1, wherein the number of language objects comprise a number of word objects and a number of n-gram objects, and further wherein the frequency value corresponds to either a frequency value of a n-gram object corresponding with the junction object or a frequency value of zero if no n-gram object corresponding with the junction object is found.

4. The method of claim 1, further comprising:
   determining that an intermediate set of characters of the ambiguous text input following the initial set of characters is consistent with a suffix object in the memory;
   employing as the another set of characters of the ambiguous text input the set of characters of the ambiguous text input following the intermediate set of characters; and
   generating as the junction object an object comprising the terminal character of the first language object, the suffix object, and the initial character of the second language object.

5. An electronic device comprising:
   a processor apparatus comprising a processor and a memory having stored therein a number of language objects and a number of associated frequency values, at least some of the language objects each comprising a number of characters;
   a display; and the memory further having stored therein one or more routines which, when executed on the processor, cause the electronic device to perform operations comprising:

detecting an ambiguous text input including a set of characters;

generating a set of language objects, at least one language object in the set of language objects comprising a first language object that corresponds with an initial set of characters of the ambiguous text input and a second language object that corresponds with another set of characters of the ambiguous text input;

generating a junction object comprising a terminal character of the first language object and an initial character of the second language object;

determining a frequency value associated with the junction object; and outputting a representation of the at least one language object based, at least in part, on the determined frequency value.

6. The electronic device of claim 5, wherein the outputting comprises at least one of:

outputting the representation of the at least one language object at a position of relatively lower priority than a representation of another language object in the set of language objects, or suppressing from the output the at least one language object.

7. The electronic device of claim 5, wherein the number of language objects comprise a number of word objects and a number of n-gram objects, and further wherein the frequency value corresponds to either a frequency value of a n-gram object corresponding with the junction object or a frequency value of zero if no n-gram object corresponding with the junction object is found.

8. The electronic device of claim 5, wherein the operations further comprise:

determining that an intermediate set of characters of the ambiguous text input following the initial set of characters is consistent with a suffix object in the memory;

employing as the another set of characters of the ambiguous text input the set of characters of the ambiguous text input following the intermediate set of characters; and generating as the junction object an object comprising the terminal character of the first language object, the suffix object, and the initial character of the second language object.

\* \* \* \* \*